US008820646B2

(12) United States Patent
Yoshida

(10) Patent No.: US 8,820,646 B2
(45) Date of Patent: Sep. 2, 2014

(54) REMOTE CONTROL DEVICE CAPABLE OF READING DOT PATTERNS FORMED ON MEDIUM DISPLAY

(76) Inventor: Kenji Yoshida, Tokyo (JP)

( * ) Notice: Subject to any disclaimer, the term of this patent is extended or adjusted under 35 U.S.C. 154(b) by 0 days.

(21) Appl. No.: 12/681,431

(22) PCT Filed: Oct. 6, 2008

(86) PCT No.: PCT/JP2008/002813
§ 371 (c)(1),
(2), (4) Date: Sep. 14, 2010

(87) PCT Pub. No.: WO2009/044563
PCT Pub. Date: Apr. 9, 2009

(65) Prior Publication Data
US 2011/0006108 A1 Jan. 13, 2011

(30) Foreign Application Priority Data
Oct. 5, 2007 (JP) ................................ 2007-262672

(51) Int. Cl.
*G06K 7/10* (2006.01)

(52) U.S. Cl.
USPC ................. 235/470; 235/472.01; 235/472.02; 235/472.03; 235/487

(58) Field of Classification Search
USPC ............... 235/375, 435, 454, 462.41, 462.43, 235/462.45, 462.46, 462.49, 470, 4, 72.01, 235/472.02, 472.03, 487, 494
See application file for complete search history.

(56) References Cited

U.S. PATENT DOCUMENTS

| | | | | |
|---|---|---|---|---|
| 6,225,938 | B1 * | 5/2001 | Hayes et al. | 341/176 |
| 6,593,908 | B1 * | 7/2003 | Borgstrom et al. | 345/156 |
| 6,832,116 | B1 * | 12/2004 | Tillgren et al. | 700/1 |
| 7,922,099 | B1 * | 4/2011 | Schmidt et al. | 235/494 |
| 8,140,190 | B2 * | 3/2012 | Ferragut et al. | 700/275 |
| 2002/0030104 | A1 | 3/2002 | Matsui et al. | |
| 2003/0118166 | A1 * | 6/2003 | Lapstun et al. | 379/201.01 |
| 2003/0169864 | A1 * | 9/2003 | Lapstun et al. | 379/201.01 |
| 2005/0216606 | A1 * | 9/2005 | Hayes et al. | 710/5 |
| 2006/0028400 | A1 * | 2/2006 | Lapstun et al. | 345/8 |
| 2006/0242555 | A1 * | 10/2006 | Lapstun et al. | 715/501.1 |

FOREIGN PATENT DOCUMENTS

| | | |
|---|---|---|
| JP | 2008-077693 A | 3/1996 |
| JP | 2006-079688 A | 3/2006 |
| JP | 2007-081743 A | 3/2007 |

* cited by examiner

*Primary Examiner* — Paultep Savusdiphol
(74) *Attorney, Agent, or Firm* — Konomi Takeshita

(57) ABSTRACT

A remote control device with excellent convenience, operability, and affinity, which can be intuitively operated and does not require much time to learn its operation, is provided. The remote control device comprises an optical reading unit for reading an optically readable dot pattern, a main body that is connected to the optical reading unit and can be held by gripping or just like holding a pen, a converter equipped inside the main body, for analyzing a dot code and/or a coordinate value from a dot pattern read out by the optical reading unit and converting into one or two or more corresponding transmission codes, an operation unit, equipped at the other end of the main body on the opposite side to the optical reading unit, operable at least in longitudinal and lateral directions, and a transmission unit, equipped at a predetermined position of the main body, for outputting a transmission code converted by the converter and an operation instruction attributable to the operation unit and an operation instruction attributable to another button as a signal to the control-subject apparatus.

28 Claims, 28 Drawing Sheets

| DOT CODE | INFRARED CODE |
|---|---|
| 53001 | POWER ON/OFF |
| 53002 | TERRESTRIAL ANALOG |
| | CHANNEL 1 |
| 53003 | TERRESTRIAL DIGITAL |
| | CHANNEL 1 |
| ~ | ~ |

TRANSMISSION CODE CONVERSION TABLE 01

| OPERATION ICON DOT CODE | INFRARED CODE | | |
|---|---|---|---|
| | MANUFACTURER CODE | PRODUCT CODE | INSTRUCTION CODE |
| 1001 | MANUFACTURER A | TV | POWER ON/OFF |
| 1002 | MANUFACTURER A | TV | VOLUME UP |
| 1003 | MANUFACTURER A | TV | VOLUME DOWN |
| ⋮ | ⋮ | ⋮ | ⋮ |

FIG.30A

TRANSMISSION CODE CONVERSION TABLE 02

| OPERATION ICON DOT CODE | INFRARED CODE | | |
|---|---|---|---|
| | MANUFACTURER CODE | PRODUCT CODE | INSTRUCTION CODE |
| 1001 | MANUFACTURER B | TV | POWER ON/OFF |
| 1002 | MANUFACTURER B | TV | VOLUME UP |
| 1003 | MANUFACTURER B | TV | VOLUME DOWN |
| ⋮ | ⋮ | ⋮ | ⋮ |

FIG.30B

CONTROL-SUBJECT APPARATUS A (TABLE NO.1)

| OPERATION BUTTON | OPERATION INSTRUCTION (INFRARED CODE OR CONTROL OF REMOTE CONTROLLER) | | |
|---|---|---|---|
| | MANUFACTURER CODE | PRODUCT CODE | INSTRUCTION CODE |
| BUTTON A | MANUFACTURER A | TV | POWER ON/OFF |
| BUTTON B | MANUFACTURER A | TV | VOLUME UP |
| BUTTON C | MANUFACTURER A | TV | VOLUME DOWN |
| ⋮ | ⋮ | ⋮ | ⋮ |

CONTROL-SUBJECT APPARATUS B (TABLE NO. 2)

| OPERATION ICON DOT CODE | INFRARED CODE | | |
|---|---|---|---|
| | MANUFACTURER CODE | PRODUCT CODE | INSTRUCTION CODE |
| BUTTON A | MANUFACTURER B | TV | POWER ON/OFF |
| BUTTON B | MANUFACTURER B | TV | VOLUME UP |
| BUTTON C | MANUFACTURER B | TV | VOLUME DOWN |
| ⋮ | ⋮ | ⋮ | ⋮ |

FIG.31

| OPERATION ICON CODE | INFRARED CODE | | |
|---|---|---|---|
| | MANUFACTURER CODE | PRODUCT CODE | INSTRUCTION CODE |
| 001001 | MATSUSHITA | TV | POWER ON/OFF |
| 001002 | MATSUSHITA | TV | VOLUME UP |
| 001003 | MATSUSHITA | TV | VOLUME DOWN |
| ≀ | ≀ | ≀ | ≀ |
| 002001 | SHARP | TV | POWER ON/OFF |
| ≀ | ≀ | ≀ | ≀ |
| 101001 | HITACHI | DVD PLAYER | POWER ON/OFF |
| ≀ | ≀ | ≀ | ≀ |

FIG.33

| ICON NAME | INFRARED CODE | | |
|---|---|---|---|
| | MANUFACTURER CODE | PRODUCT CODE | INSTRUCTION CODE |
| TRANSMIT INPUT SELECTION ONCE | MANUFACTURER X | TV | CH 1 →INPUT SELECTION |
| TRANSMIT INPUT SELECTION TWICE | MANUFACTURER X | TV | CH 1 →INPUT SELECTION →INPUT SELECTION |
| TRANSMIT INPUT SELECTION THREE TIMES | MANUFACTURER X | TV | CH 1 →INPUT SELECTION →INPUT SELECTION →INPUT SELECTION |
| ⋮ | ⋮ | ⋮ | ⋮ |

REMOTE CONTROL DEVICE CAPABLE OF READING DOT PATTERNS FORMED ON MEDIUM DISPLAY

CROSS REFERENCE TO RELATED APPLICATIONS

This application claims priority under 35 U.S.C. 119 based upon Japanese Patent Application Serial No. 2007-262672, filed on Oct. 5, 2007. The entire disclosures of the aforesaid applications are incorporated herein by reference.

FIELD OF THE INVENTION

The present invention relates to a remote control device which is capable of reading a dot pattern formed on a medium and a display and used for remotely operating home electric appliances, electric devices, and the like.

BACKGROUND OF THE INVENTION

Recently, home electric appliances, electric devices, and the like, have been significantly progressed, with new products developed and sold day after day. For example, in a television field, products that can receive a variety of television broadcasts, including satellite broadcast and cable television as well as conventional terrestrial broadcast, are increasing. In addition, set-top boxes that can be connected to a television and display/output a variety of content on the television, are increasingly available including a possibility of browsing of the Internet, mail-ordering, and doing karaoke.

As the home electric appliances, such as a television, offer an increasing range of functions and even more sophisticated functionalities as described above, remote control devices for carrying out operations and controls of the appliances (hereafter, referred to as the “remote control device” or as the “remocon”, which is a Japanese word that contracts the words “remote” and “control”) tend to have more operation buttons and become larger in size, while the operation procedures become complicated.

However, a large remote control device has a problem in which it is hard to hold and gives low affinity for users. Further, due to the large number of operation buttons and complicated operation procedures, it is hard for users to understand which button to press to get a desired operation and takes time to become familiar with operations of the remote control device.

To solve such problems, there is proposed a remote control device such as the one in Japanese Patent Application Publication No. 2007-81743. The remote control device disclosed in Japanese Patent Application Publication No. 2007-81743 has a shape in which three generally flat plates are connected and the cross-section shape through the connected direction forms generally arched shape. Having such a shape allows a user to perform operations in an effortless position when the user operates with one hand. Also, an operation unit for instructing operations according to a first objective (control of an information processing application) is disposed on the surfaces of top sides of the flat plates disposed of both sides of the remote control device, and an operation unit for instructing operations according to a second objective (control of normal television broadcast and data broadcast) is disposed on the surface of the bottom side of the middle flat plate. Due to such a structure, holding positions of the remote control device are different between the first and the second objectives, which allows a user to operate multifunctional control-subject apparatuses with easier manipulation than the conventional way.

However, with Japanese Patent Application Publication No. 2007-81743, there is a problem in which, although it is easy to understand which side should be used to operate the user’s target control, it requires a user considerable time to learn and understand which operation button should be pressed when performing an actual operation, due to a large number of operation buttons and wheels on both sides of the remote control device.

Further, if a conventional remote control device including the one in Japanese Patent Application Publication No. 2007-81743 is used to control an apparatus compatible with cable television, multi-channel satellite broadcast, and terrestrial digital broadcast, a menu is first required to be shown on a television screen, and from that menu, a user should reach a target operation instruction screen while proceeding the hierarchical structure. This requires the user to perform complicated operational procedures to get the desired operation done.

The invention was devised in consideration of the above points and aims to achieve a technical subject that is to provide a remote control device with excellent convenience, operability and affinity, which allows intuitive operation and requires less time for learning operation.

SUMMARY OF THE INVENTION

A first aspect of the invention is a remote control device comprising: an optical reading unit for reading an optically readable dot pattern that is formed on a predetermined medium surface and made into a pattern based on a predetermined algorithm; a main body connected with the optical reading unit and can be gripped or held like a pen depending on a user and/or a use purpose; a converter, equipped inside the main body, for analyzing a dot code and/or a coordinate value from a dot pattern read out by the optical reading unit and converting into one or two or more corresponding transmission codes; an operation unit, equipped at the other end of the main body on the opposite side to the optical reading unit, operable at least in longitudinal and lateral directions in order to move a cursor for selecting an item from among a plurality of selectable menus displayed on a display and/or selecting an item without using a cursor; and a transmission unit, equipped on a predetermined position of the main body, for outputting a transmission code converted by the converter and an operation instruction attributable to the operation unit and an operation instruction attributable to another button as a signal to the control-subject apparatus.

According to this, it is possible to easily read a dot pattern formed on a predetermined medium surface and made into a pattern based on a predetermined algorithm. For example, operations, reproducing the content, and the like can be easily performed just by preparing a medium, such as a booklet for operation, a program guide, and a program listing, on which a dot pattern is printed, and a single touch of such a medium with the remote control device. This realizes provision of a remote control device that is easy to operate and excellent in convenience and affinity for users.

A second aspect of the invention is the remote control device according to the first aspect, in which the optical reading unit can optically read the dot pattern printed on the medium or displayed on a display and made into a pattern based on the predetermined algorithm.

According to this, the remote control device can optically and easily read a dot pattern printed on a medium or displayed on a display and made into a pattern based on a predetermined algorithm as a reading target.

A third aspect of the invention is the remote control device according to the first aspect, in which the optical reading unit can optically read the dot pattern printed on a transparent sheet as an information input assenting sheet placed on the medium or attached on a display, and made into a pattern based on the predetermined algorithm.

According to this, the remote control device can optically and easily read a dot pattern printed on a transparent sheet as an information input assenting sheet placed on the medium or attached on a display and made into a pattern based on a predetermined algorithm, as a reading target.

A fourth aspect of the invention is a remote control device according to any one of the first to third aspects, in which the optical reading unit can optically read the dot pattern superimposed and printed on the medium or the information input assisting sheet or superimposed and displayed on a display, with a still image or a motion image, such as a text, a figure, an illustration, and a photograph.

According to this, the remote control device can optically and easily read the dot pattern superimposed and printed on the medium or the information input assisting sheet or superimposed and displayed on a display, with a still image or a motion image, such as a text, a figure, an illustration, and a photograph, as a reading target.

A fifth aspect of the invention is the remote control device according to any one of the first to fourth aspects, in which the transmission unit has a function for transmitting an infrared signal to the control-subject apparatus and one or two or more of the transmission units are provided near the operation unit.

According to this, it is possible to provide a remote control device easy to operate and excellent in convenience and affinity for users even to the television receivers and set-top boxes that are in widespread use by transmitting an infrared signal to the control-subject apparatus.

A sixth aspect of the invention is the remote control device according to any one of the first to fifth aspects, in which a transmission button that has an operation function for outputting a signal from the transmission unit to the control-subject apparatus is provided at a predetermined location on the main body According to this, after being read out by the optical reading unit and converted, the transmission code can be arbitrarily transmitted.

A seventh aspect of the invention is the remote control device according to any one of the first to sixth aspects, in which the transmission button provided on the main body has a repeat function for retransmitting one or two or more signals when the signal transmitted from the transmission unit was not recognized by the control-subject apparatus and/or a batch transmission function for transmitting a plurality of operations to be carried out by reading the dot pattern with the optical reading unit.

According to this, if an infrared signal was transmitted and the transmitted signal could not be recognized by the control-subject apparatus due to an obstacle or the like, the transmission code can be easily retransmitted. Also, dot patterns sequentially read out by the optical reading unit can be collectively converted into transmission codes, and one or two or more signals can be collectively transmitted, which provides excellent convenience.

An eighth aspect of the invention is the remote, control device according to any one of the first to seventh aspects, in which the operation unit is provided on an inclination surface of the other end of the main body inclined with reference to the longitudinal axes of the main body, and the inclination surface is disposed to face an operator when operating by holding the main body just as holding a pen with the optical reading unit directed downward, or the inclination surface is disposed to face the control-subject apparatus when operating by gripping the main body with the transmission unit oriented in the direction of the control-subject apparatus.

According to this, it is possible to provide a remote control device easy to operate and excellent in convenience and affinity for users, as a variety of holding styles can be selected so that the optical reading unit of the remote control device can easily read a dot pattern provided on a medium or a display as well as the transmission unit of the remote control device can transmit a signal with an appropriate angle to the control-subject apparatus.

A ninth aspect of the invention is the remote control device according to any one of the first to eighth aspects, in which the operation unit has a plurality of operation buttons capable of operating at least in longitudinal and lateral directions, each independently disposed thereon, or an operation button solely capable of operating at least in longitudinal and lateral directions disposed thereon.

According to this, it is possible to provide a remote control device easy to operate and excellent in convenience and affinity for users since the operation unit of the remote control device has an arrow key operable in longitudinal and lateral directions or a key that has a similar function.

A tenth aspect of the invention is a remote control device according to any one of the first to ninth aspects, in which the operation unit has a enter button for determining selected content after a predetermined operation is selected, and the enter button is disposed at the center of or near the operation button for operating in longitudinal and lateral directions, or the operation unit has one unit of button main body that has a function for performing a variety of operations and/or a function for selecting and determining by pressing any part of the button main body An eleventh aspect of the invention is the remote control device according to any one of the first to tenth aspects, in which the enter button is disposed at the center of or near the operation button or integrated with the operation button, as well as at an arbitrary position in which a dot pattern can be read out by the optical reading unit by gripping the main body or holding the main body just like a pen and the enter button can be easily pressed.

An twelfth aspect of the invention is the remote control device according to any one of the first to eleventh aspects, in which the operation unit has a pointing device used as a coordinate instruction input assisting device, such as a pointing stick, capable of moving the cursor an arbitrary distance in an arbitrary direction and arbitrarily selecting and determining a selection.

According to this, it is possible to provide a remote control device with excellent convenience and affinity for users, which can easy operate a cursor displayed on a display, since the operation unit of the remote control device uses a pointing device as an coordinate instruction input assisting device.

A thirteenth aspect of the invention is the remote control device according to any one of the first to twelfth aspects having a function capable of manipulating in longitudinal and lateral directions, in which a display of the remote control device displays a predetermined menu, a plurality of items in the menu are in selectable states, and an item can be selected and determined by recognizing the inclination of the longitudinal axes of the main body within a predetermined time period, in which, by handling the main body as a joystick, a tilting movement by a predetermined angle or more toward the opposite direction of the operator or a tilting movement by a predetermined angle or more toward the direction of the operator from an initial inclination state of the main body selects an item above or below the presently selected item, and a tilting movement by a predetermined angle or more toward left direction seen from the operator or a tilting movement by a predetermined angle or more toward right direction seen from the operator selects an item at left or right of the presently selected item, returning the main body to the initial inclination state within a predetermined time period causes the main body to be a standby state waiting for performing a next operation, and, if the predetermined time period is over, items above, below, left, or right are displayed and selected one after another, each for a predetermined elapsed time, until returning the main body to the initial inclination state.

According to this, it is possible to provide a remote control device easy to operate and excellent in convenience and affinity for users, since the remote control device has a mechanism for detecting and recognizing the inclination of the main body, and is capable of selecting a variety of operations by tilting or other movements of the main body.

A fourteenth aspect of the invention is the remote control device according to any one of the first to twelfth aspects having a function capable of manipulating in longitudinal and lateral directions, in which the display displays a cursor, a predetermined item is selected and waiting for determination or no item is selected, the main body is handled as a joystick by recognizing a temporal change in the inclination of the longitudinal axes of the main body by a predetermined method, if the main body is tilted by a predetermined angle or more in an arbitrary direction from the inclination state of the main body, the cursor moves according to a predetermined algorithm corresponding to an angle changed by tilting the main body in the same direction and an item becomes selected in a state where the cursor is positioned over the item, and, if the main body is returned to the initial inclination state, the cursor stops moving and turns to a standby state for performing a next operation.

According to this, it is possible to provide a remote control device easy to operate and excellent in convenience and affinity for users, since the remote control device has a mechanism for detecting and recognizing the inclination of the main body and a variety of operations using a cursor can be selected by tilting or other movements of the main body.

A fifteenth aspect of the invention is the remote control device according to any one of the first to twelfth aspects having a function capable of manipulating in longitudinal and lateral directions, in which the main body has an initial inclination state where the main body stands generally perpendicular to a medium surface with the optical reading unit touching the medium surface at the time of starting recognition, calibration setting is carried out with a light and dark state of an image read out by the optical reading unit in the initial inclination state as an initial light and dark state, and change of angle when tilting the main body while keeping the optical reading unit touching on the medium surface is recognized relatively by a difference between the light and dark state of the image captured by the optical reading unit and the initial light and dark state.

According to this, an intuitive tilting operation can be accurately recognized regardless of differences among lot units generated through production of optical reading units and an angle of the remote control device main body with reference to the medium surface when the optical reading unit touches the medium surface.

A sixteenth aspect of the invention is the remote control device according to any one of the first to fifteenth aspects, in which, on the main body, at least one button for arbitrarily performing an operation corresponding to a position of a cursor displayed on a display and having identical functions as left and right buttons of a mouse, is disposed near the operation unit and/or at an arbitrary position in which the enter button can be easily pressed by holding the main body just as holding a pen.

According to this, the remote control device can also be used to control a personal computer and access the Internet, which realizes an interface device for new media that integrate the Internet and a television. Further, two or more buttons having the same functions as left and right buttons of a mouse may be provided.

A seventeenth aspect of the invention is the remote control device according to any one of the first to sixteenth aspects, in which the main body has a menu button having a function of listing contents and operation items provided by the control-subject apparatus, and a back button, near the menu button, for going back to the previous menu display when menu items are consecutively selected.

An eighteenth aspect of the invention is the remote control device according to any one of the first to seventeenth aspects, in which the main body has a volume button for tuning sound volume of the control-subject apparatus and a power button for performing on and off operations for the power of the control-subject apparatus.

A nineteenth aspect of the invention is the remote control device for irradiating an infrared signal in order to perform a variety of operations to a control-subject apparatus according to any one of the first to eighteenth aspects. The remote control device comprises an operation unit having a plurality of operation buttons; a main body provided with the operation unit; and an infrared emission unit provided on a part of the main body. The infrared emission unit comprising: one or two or more of infrared emission elements for irradiating light directly the main body side; and a convex mirror surface unit or a diffusion reflector provided on the main body side. The convex mirror surface unit or the diffusion reflector enlarges the irradiated area by reflecting the infrared signal irradiated from the infrared emission elements into multiple directions.

According to this, since the remote control device has a structure in which a convex mirror surface unit or a diffusion reflector is disposed at a position where the convex mirror surface unit or the diffusion reflector can expand the area irradiated with infrared rays, the remote control device can irradiate infrared rays to appropriately control the control-subject apparatus, regardless of the position of the remote control device such as standing or inclined with reference to the control-subject apparatus. Therefore, although LEDs whose infrared irradiation angles are 60 degrees are conventionally required to be disposed at two locations, by providing a convex mirror surface unit or a diffusion reflector, the area irradiated with infrared rays can be further expanded and a single LED is sufficient, realizing a decrease in component costs and a significant decrease in power consumption.

According to the invention, it is possible to provide a remote control device with excellent convenience, operability, and affinity for users.

BRIEF DESCRIPTION OF THE DRAWINGS

FIG. 7A disposes two dots, FIG. 7B disposes four dots, and FIG. 7C disposes five dots.

FIG. 8A is a schematic diagram of six-dot arrangement, FIG. 8B is a schematic diagram of nine-dot arrangement, FIG. 8C is a schematic diagram of 12-dot arrangement, and FIG. 8D is a schematic diagram of 36-dot arrangement.

FIGS. 30A and 30B are diagrams illustrating a transmission code conversion table.

FIG. 31 is a diagram illustrating an operation button-operation instruction table for each control-subject apparatus.

FIG. 33 is a diagram illustrating a second transmission code conversion table.

DETAILED DESCRIPTION OF THE INVENTION

The best mode for carrying out the invention is described by reference to the drawings.

Figure 1:
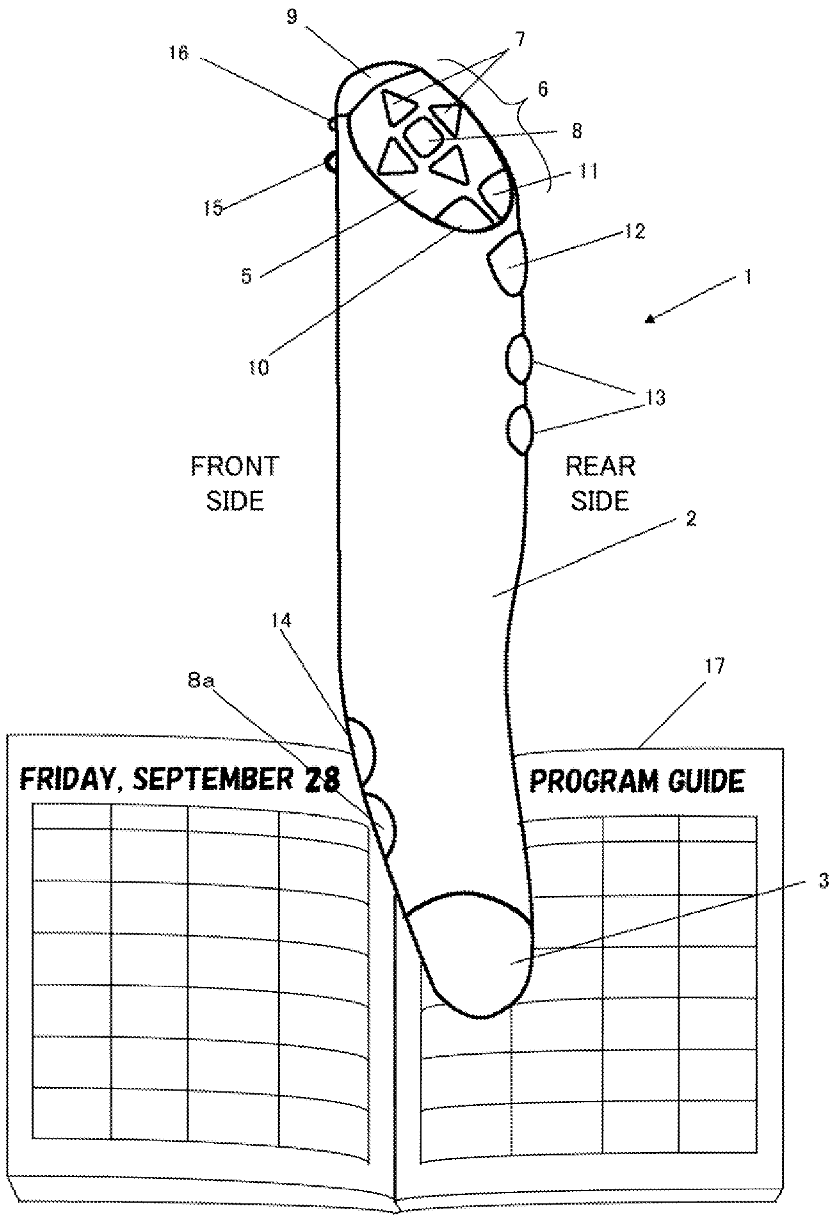
FIG. 1 is a perspective view of the remote control device of the invention.

FIG. 1 is a diagram illustrating a perspective view of the remote control device 1 which is an embodiment of the invention and a use situation of the remote control device 1.

The remote control device 1 incorporates a sensor unit (an optical reading unit) 3 at the leading end of the device body 2 (lower end in the drawing), and, although not shown in the drawings, is equipped with infrared irradiation means, such as an infrared LED, and imaging means, including a CCD and a CMOS for imaging reflected light from a dot pattern that is described later.

On the opposite end to the sensor unit 3 of the device body 2 (upper end in the drawing), an inclination surface 5 inclined with reference to the longitudinal axis of the device body 2 is formed. The inclination surface 5 is equipped with an operation unit 6. On the operation unit 6, there are disposed arrow keys 7 where operation directions are formed cruciately to move a cursor or select an item displayed on a screen of a display device that is connected to a television receiver or set-top box as a control-subject. At the center of the arrow keys 7, an enter button 8 for determining a selected operation is provided. Above the arrow key is provided an infrared emission unit (a transmission unit) 9 to transmit infrared rays. Further, below the arrow keys is provided a menu button 10 for listing content and/or operations (for example, a main menu). In the vicinity of the menu button 10, there is a back button 11 for returning to a previous menu display when menu items are sequentially selected.

On the upper portion of the rear side of the device body 2, a power switch 12 which switches on or off the power of a television receiver or a set-top box as a control subject and a volume button 13 (a + button for increasing the volume and a − button for decreasing the volume) are provided. On the lower portion of the front side of the device body 2, a transmission button 14 is provided for instructing output of infrared signals from an infrared emission unit 9. The transmission button 14 has a repeat transmission function to transmit a signal again when the control-subject unit could not receive the signal transmitted from the infrared transmission unit 9 and/or a batch transmission function for collectively transmitting a plurality of operations performed by the sensor unit 3. Further, below the transmission button 14, a second enter button 8*a* is provided, which has a similar function to the enter button 8 provided on the operation unit 6.

It should be noted that, although, in FIG. 1, the volume button 13 is provided on the upper portion of the rear side of the device body 2, the volume button may be provided at an easily operable position on the front side.

Also, at the upper portion of the front side of the device body 2, a power button 15 to turn on or off the power of the remote control device 1 is provided. It should be noted that the power button 15 may be omitted if the remote control device 1 is embedded with a mechanism by which the remote control device 1 is automatically activated when any one of the buttons disposed on the remote control device 1 is pressed, when the sensor unit 3 touches a medium surface, or when the remote control device 1 is held by a hand.

A status indication LED 16 is provided on the upper surface of the front side of the remote control device 1, so that the charge status or the operation status of the sensor unit 3 can be seen at a glance. It should be noted that the status indication LED 16 may be provided, with the power button 15, on a different position as long as the status indication LED can be spotted easily.

A user can easily perform operations similar to the ones with a conventional infrared remote control device, such as changing of a channel, reproducing and recording of a video, just by preparing a medium 17, such as a booklet for operation, program guide, or program listing, on which dot patterns are printed, and through a one-touch operation of the remote control device 1 on the medium 17 as shown in FIG. 1.

Moreover, with a medium on which a program guide or a program listing is superimposed and printed with a dot pattern, only a touch with a remote control device 1 on the area printed with a desired program description, a program photo, or a program listing, realizes reservation of a program, viewing of a program, downloading of program content through VOD (video on demand), or the like. In addition, television shopping and browsing of the Internet can be realized with a single touch.

Figure 2:
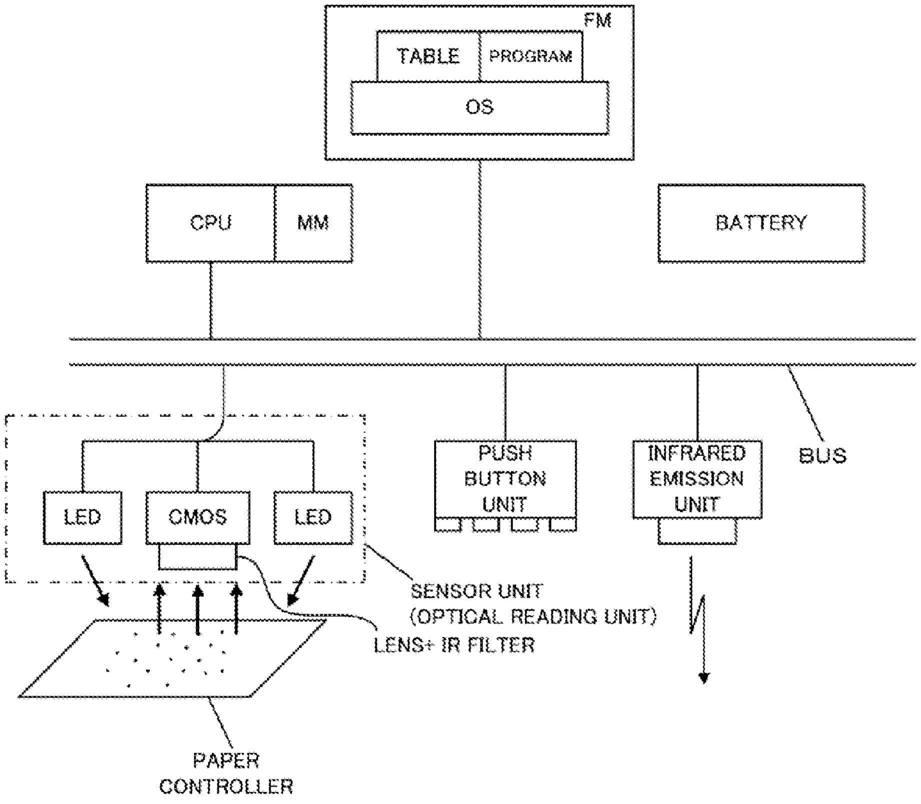
FIG. 2 is a block diagram of the internal configuration of the remote control device.

FIG. 2 is a hardware block diagram illustrating a structure of the remote control device 1 described above.

As shown in FIG. 2, the remote control device 1 is composed of a main memory (MM), a battery, a flash memory (FM) connected through a bus, an infrared emission unit 9, a push button unit (operation unit), and a sensor unit 3 (optical reading unit), centering on a central processing unit (CPU).

The flash memory (FM) stores an operating system (OS) as well as programs such as a dot pattern analysis program used in this embodiment and a variety of tables, such as a dot code-infrared code correspondence table.

The central processing unit (CPU) performs an execution processing by sequentially reading the programs in the flash memory through a bus (BUS) and a main memory (MM).

The push button unit is composed of a variety of buttons such as an arrow key 7, an enter button 8, a power button 15, a volume button 13, and a transmission button 14. When each button is pressed, the central processing unit receives a signal signifying that the button was pressed and performs a processing corresponding to each button.

The battery is a power supply unit for driving the remote control device 1. In this embodiment, the battery may be a primary battery or a secondary rechargeable battery.

The sensor unit 3 is composed of an LED as infrared irradiation means, a lens, an IR filter which transmits infrared rays of a predetermined frequency wave and blocks rays of light of other frequency waves, and a CMOS sensor as an optical imaging element. When the LED irradiates a medium surface, the optical imaging element captures the reflected light of the irradiation light. Here, the dot pattern on the medium surface is printed with a carbon ink or a stealth ink (invisible ink) and a part other than the dot pattern is printed with an ink having a characteristic to reflect or transmit infrared rays, such as a non-carbon ink. It should be noted that, if light-permeable ink is used, the transmitted infrared rays are reflected from the medium surface and transmit through the ink again and captured by the optical imaging element.

Since these carbon ink and stealth ink (invisible ink) have a characteristic to absorb infrared rays, only dot parts that could not get the reflected light are imaged as black in the captured image by the optical imaging element.

Here, as for the irradiation light, although this embodiment describes a case where infrared rays are used with a dot pattern printed with a carbon ink and a stealth ink (invisible ink), the irradiation light and ink characteristic are not limited to this case, for example, ultraviolet rays or rays of light having a predetermined frequency wave may be used with an ink, for printing a dot pattern, having a characteristic that absorbs ultraviolet rays or a characteristic that changes light property.

From the captured image of the dot pattern read out in this manner, the dot pattern analysis program running in the central processing unit (CPU) in the remote control device 1 calculates a code value and/or a coordinate value. Then the dot pattern is converted into a predetermined infrared code and transmitted to the infrared reception unit of a television receiver or set-top box through the infrared emission unit 9.

FIGS. 3 to 9B describe such a dot pattern.

<Description of Dot Pattern>

FIGS. 3 to 8D are explanatory diagrams showing GRID1 that is an example of the dot pattern.

It should be noted that, in these diagrams, grid lines in horizontal and vertical directions are added for convenience of description, and do not exist in an actual printing surface. If a scanner as imaging means has infrared irradiation means, a key dot 102, a reference grid point dot 103, an information dot 104 and the like constituting a dot pattern 101, are preferably printed with a carbon ink or a stealth ink (invisible ink), which absorbs the infrared rays.

Figure 3:
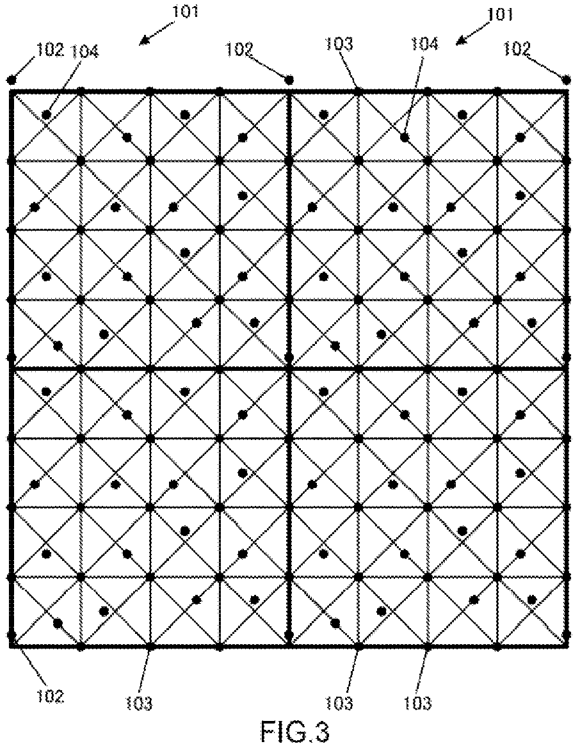
FIG. 3 is an explanatory diagram showing an example of a dot pattern of GRID1.
Figure 4A:
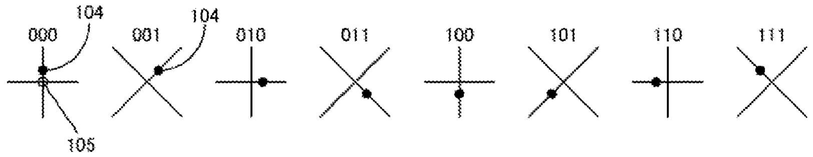
FIGS. 4A and 4B are enlarged views showing an example of information dots in a dot pattern of GRID1.
Figure 4B:
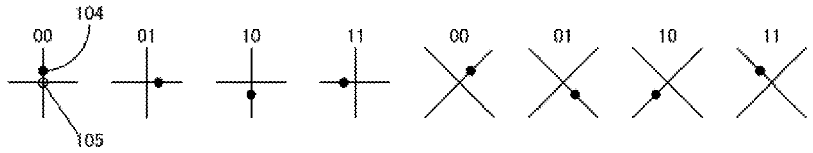

FIG. 3 is an enlarged view showing an example of arrangements of key dots 102, reference grid point dots 103, and information dots 104, of a dot pattern 101. FIGS. 4A and 4B are explanatory diagrams showing information dots 104 representing vector information and the coded values.

The information input and output method using a dot pattern comprises means for generating a dot pattern 101, means for recognizing the dot pattern 101, means for analyzing the dot pattern 101, and outputting information and a program. That is, after retrieving a dot pattern 101 as image data with a sensor unit 3, first, the method extracts a reference grid point dot 103 based on the program read out by the CPU, then, extracts a key dot 102 based on the fact that there is no dot at the location where a reference grid point dot 103 supposed to be and a dot is disposed at a location shifted in a predetermined direction, to specify the dot pattern 101 of one block and the direction thereof. Next, the method extracts an information dot 104 surrounded by four reference grid point dots 103 or key dots 102, encodes the information dot 104 according to a predetermined algorithm, decodes into a predetermined code value and/or coordinate value from a collection of information dots 104, based on the arrangement of the information dots 104 in one block of the dot pattern 101, and transmits the code value and/or coordinate value as an infrared signal from the infrared emission unit 9 of the remote control device 1.

To generate the dot pattern 101, based on a dot code generation algorithm, fine dots, used for recognition of vector information for encoding, including at least one key dot 102, reference grid point dot 103, and information dot 104, are arranged in accordance with a predetermined rule. As shown in FIG. 3, in a block of a dot pattern 101, 5×5 reference grid point dots 103 are arranged, and an information dot 104 is arranged around a virtual central point 105 which is at the center surrounded by the four reference grid point dots 103 or reference grid points. It should be noted that the arrangement and structure of a block is determined by the key dot 102. In this embodiment, the key dot 102 is a dot that is not arranged on a reference grid point at a corner of a block and is arranged by shifting in a predetermined direction. The key dot determines the size of the block and defines the direction of the block, that is, the dot pattern 101. Arbitrary numerical information is defined in this block. The illustrative example of FIG. 3 shows a case where four blocks of the dot pattern 101 are arranged in parallel (in bold frame), provided, however, that the dot pattern 101 is not limited to four blocks.

It should be noted that the key dot 102 is not limited to be arranged at the corner of the block and may be arranged anywhere inside or outside the block.

When the sensor unit 3 retrieves the dot pattern 101 as image data, the dot code analysis algorithm can calibrate a distortion in an arrangement of a reference grid point dot 103 due to a distortion of a lens of the sensor unit 3, skewed imaging, expansion and contraction of a paper surface, curved medium surface, and distortion during printing. Specifically, a function for calibration (Xn, Yn)=f(Xn', Yn') is calculated for converting distorted four reference grid points 103 into the original square or rectangular, then the vector information of the correct information dot 104 is calculated by calibrating an information dot 104 using the same function.

The information dot 104 is a dot that is used for recognition of a variety of vector information. This information dot 104 is arranged within one block of a dot pattern 101 composed of a key dot 102, as well as arranged at the end point of a vector expressed with a virtual central point 105, which is surrounded by four reference grid point dots 103, as the starting point. For example, the information dot 104 is surrounded by four reference grid point dots 103 or reference grid points, and, as shown in FIG. 4A, since the dot apart from the virtual central point 105 has direction and length when expressed as a vector, the information dots 104 expresses 3 bits by being disposed in eight directions by being rotated by 45 degrees each in clockwise direction. As a result, one block of a dot pattern 1 can express 3 bits×16=48 bits.

FIG. 4B is a method for encoding each information dot 104 into 2 bits, in the dot pattern 101 of FIG. 3. Each information dot 104 is shifted in a + direction and a × direction and encoded into 2 bits, expressing 2 bits×16=32 bits. In this way, although one block of a dot pattern 101 can actually define 48-bit numerical information, the numerical information can be allocated to each 32 bits by dividing for an intended purpose. Maximum of $2^{16}$ (approximately 65,000) arrangement patterns of information dots can be realized depending on the combination of a + direction and a × direction.

It will be appreciated that the arrangement pattern is not limited to this; the information dot can be arranged in 16 directions and encoded into 4 bits, or arranged in a variety of directions and the encoding may be modified.

Preferably, the dot diameter of a key dot 102, reference grid point dot 103, and information dot 104, is in the range of approximately 0.03 mm to 0.05 mm in consideration of viewing quality, paper property, printing accuracy, the resolution of the sensor unit 3, and optimal digitization.

Also, the gap between reference grid point dots 103 is preferably in the range of approximately 0.3 mm to 0.5 mm in vertical and horizontal directions respectively in consideration of information amount required for an imaging area and possible false recognition of dots 102, 103, and 104. In consideration of false recognition of reference grid point dots 103 and information dots 104, disalignment of a key dot 102 is preferably around 20% of the grid gap.

The gap between the information dot 104 and a virtual central point 105 that is surrounded by four reference grid point dots 103 is preferably the gap that is approximately 15 to 30% of a distance between adjacent reference grid point dot 103 and virtual central point 105. If the distance between an information dot 104 and a virtual central point 105 is longer than this gap, dots are easily recognized as a big cluster, degrading the visual quality as a dot pattern 101. On the other hand, if the distance between an information dot 104 and a virtual central point 105 is shorter than this gap, recognition of the direction in which the information dot having vector information with a virtual central point 105 as the central point is located becomes difficult.

As shown in FIG. 3, one dot pattern 101 is a dot pattern 101 composed of 4×4 block regions, and 2-bit information dot 104 is disposed in each block. The dot code format of one block of a dot pattern 101 composed of a collection of the information dots 104 is shown in FIGS. 5A and 5B.

Figure 5A:
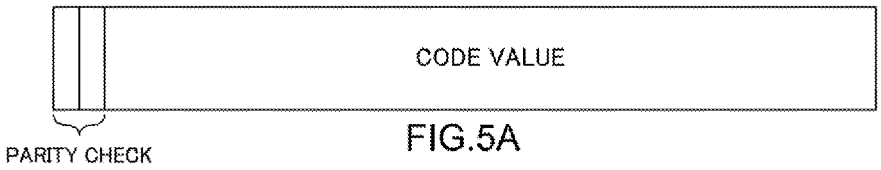
FIGS. 5A and 5B are explanatory diagrams showing dot pattern formats of GRID1.
Figure 5B:
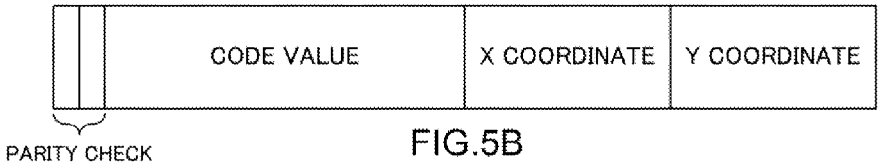

As shown in FIG. 5A, one dot pattern 101 registers a parity check and a code value. In FIG. 5B, a parity check, a code value, and an XY coordinate value are registered. It should be noted that the dot code format may be arbitrary defined.

Figure 6:
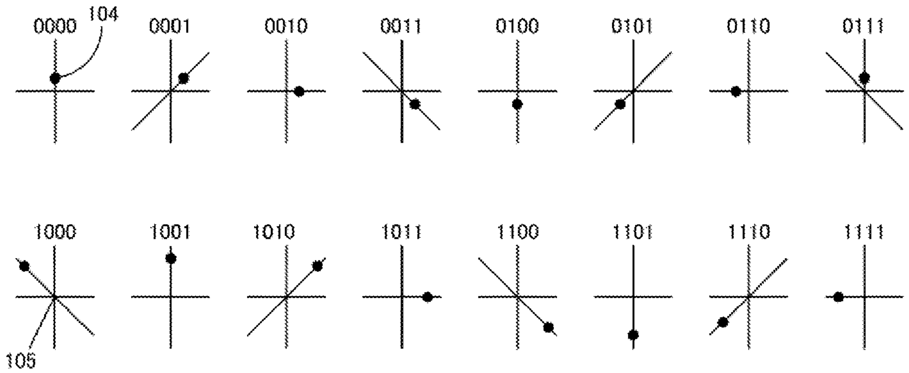
FIG. 6 is an example of information dots of GRID1 and bit expression of data defined therein, which shows another embodiment.

FIG. 6 is an example showing an information dot 104 having vector information and another embodiment of encoding. As in this case, information dots 104 can be encoded into 4 bits if using two types of information dots 104, long distance and short distance from a virtual central point 105 surrounded by reference grid point dots 103 or reference grid points, and vector directions are eight directions. Here, the long distance one is preferably approximately 25 to 30% of the distance between adjacent virtual central points 105 and the short distance one is preferably approximately 15 to 20% thereof, provided, however, the gap between the centers of information dots 104 of long distance and short distance is preferably longer than the diameter of these information dots 104 to avoid false recognition.

Figure 7A:
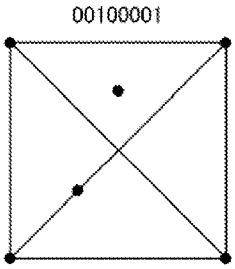
FIGS. 7A to 7C are examples of information dots of GRID1 and bit expression of data defined therein.
Figure 7B:
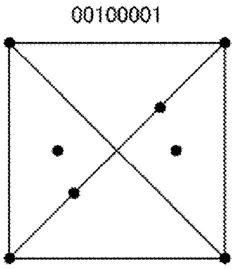
Figure 7C:
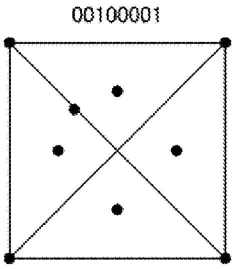

The information dot 104 is preferably one dot in consideration of visual quality, since, if there are a plurality of information dots 104 surrounded by four reference grid point dots 103 or reference grid points, adjacent dots are easily recognized as a cluster and that might form a pattern. However, if the visual quality is disregarded and large information amount is required, large amount of information can be retained by encoding each vector into 1 bit and expressing the information with a plurality of information dots 104. For example, eight concentric vectors in eight directions can encode zero to eight information dots 104 surrounded by four reference grid point dots 103 or reference grid points into 8 bits, and 16 double concentric vectors in eight directions can encode zero to 16 information dots 104 of one block into 16 bits FIGS. 7A to 7C are examples of information dots 104 which are arranged in eight directions on double concentric circles forming 16 vectors and the coded values. FIG. 7A shows that two information dots 104 are arranged; FIG. 7B shows that four information dots 104 are arranged; and FIG. 7C shows that five information dots 104 are arranged.

Figure 8A:
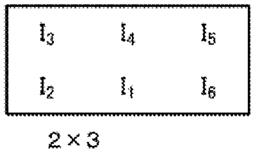
FIGS. 8A to 8D show variants of a dot pattern of GRID1.
Figure 8B:
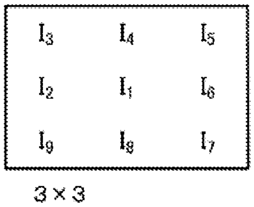
Figure 8C:
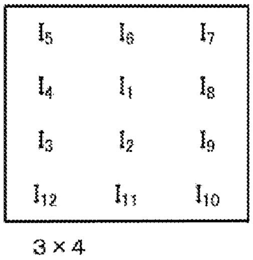
Figure 8D:
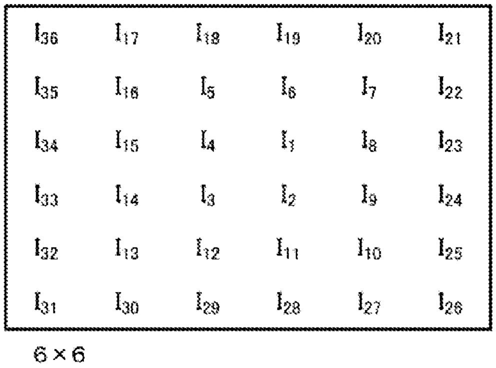

FIGS. 8A to 8D show variants of the dot pattern 101. FIG. 8A is a schematic diagram showing arrangement of six squares or rectangulars, each formed by four reference grid point dots 103 or reference grid points that surround an information dot 104. FIG. 8B is a schematic diagram showing arrangement of nine of the regions. FIG. 8C is a schematic diagram showing arrangement of 12 of the regions. FIG. 8D is a schematic diagram showing arrangement of 36 of the regions.

The dot pattern 101 shown in FIG. 3 shows an example in which 16 (4×4) information dots 104 are arranged in a block. However, this information dot 104 is not limited to 16 information dot arrangement in a block, and the region formed by four reference grid point dots 103 or reference grid points surrounding an information dot 104 and the encoding of the information dot 104 defined by the region may vary as shown in FIGS. 7A to 8D.

<Description of Dot Pattern; GRID5>

Next, another embodiment of the dot pattern 101, a direction dot, is described with reference to FIGS. 9A and 9B.

This dot pattern defines the direction of the dot pattern by arrangement and structure of the block. In FIG. 9A, reference point dots 106*a* to 106*e* are first arranged. The line connecting the reference point dots 106*a* to 106*e* defines the shape that shows the orientation of the block (in this case, a pentagon pointing upward). Then, virtual reference points 106*f* to 106*i* are arranged based on these reference point dots 106*a* to 106*e*, and an information dot 104 is arranged at the end point of vectors that have direction and length with the 106*f* to 106*i* as the starting points. In this way, in FIG. 9A, the orientation of the block can be defined by the way reference points are arranged. Further, the size of the whole block is also defined by defining the orientation of the block.

Figure 9A:
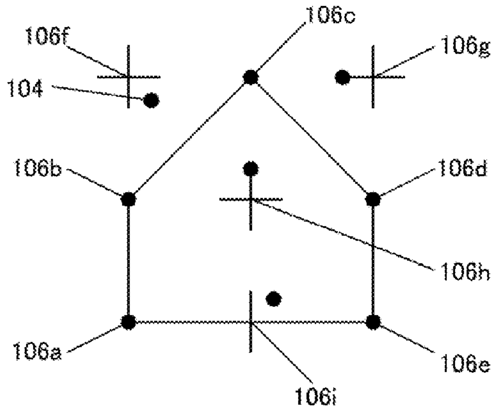
FIGS. 9A and 9B are explanatory diagrams showing a dot pattern of GRID5.

It should be noted that, although, in FIG. 9A, the reference point dots 106*a* to 106*e* and the information dot 104 are described as having the same shapes, the diameter of the reference point dots 106*a* to 106*e* may be different from the diameter of the information dot 104. Further, these reference point dots 106*a* to 106*e* and information dot 104 may take any shapes, including a triangle, a rectangle, or other polygons, as long as the reference point dots 106*a* to 106*e* can be distinguished from the information dot 104.

Figure 9B:
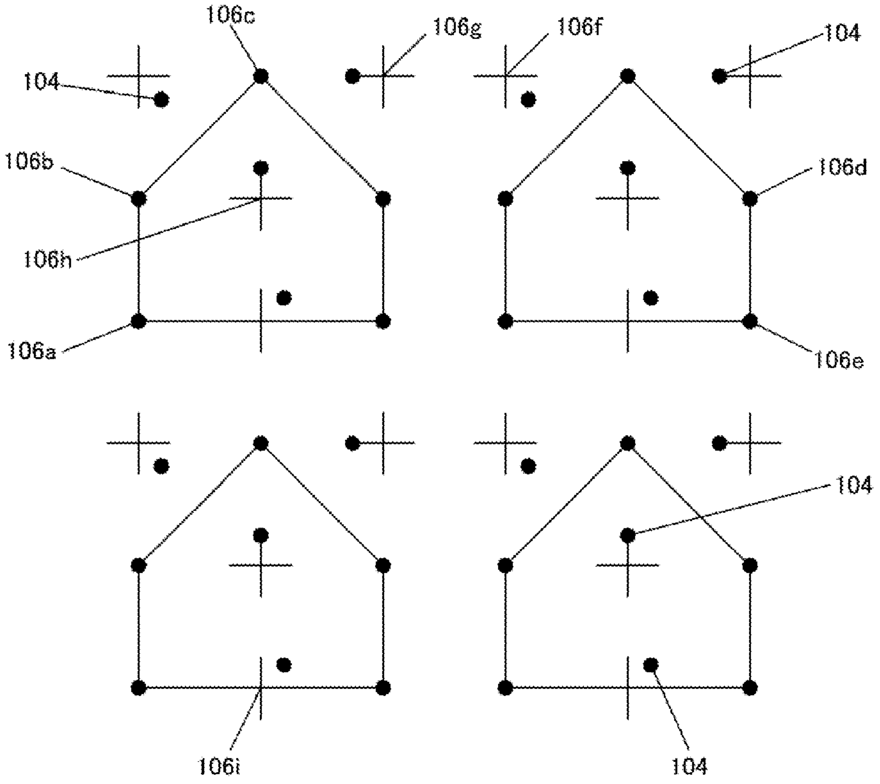

FIG. 9B shows that each two of the blocks shown in FIG. 9A are joined in vertical and horizontal directions respectively, provided, however, the arrangement shown in FIG. 9A is not limited to vertical and horizontal directions and the blocks may be joined in any arrangement.

Figure 10A:
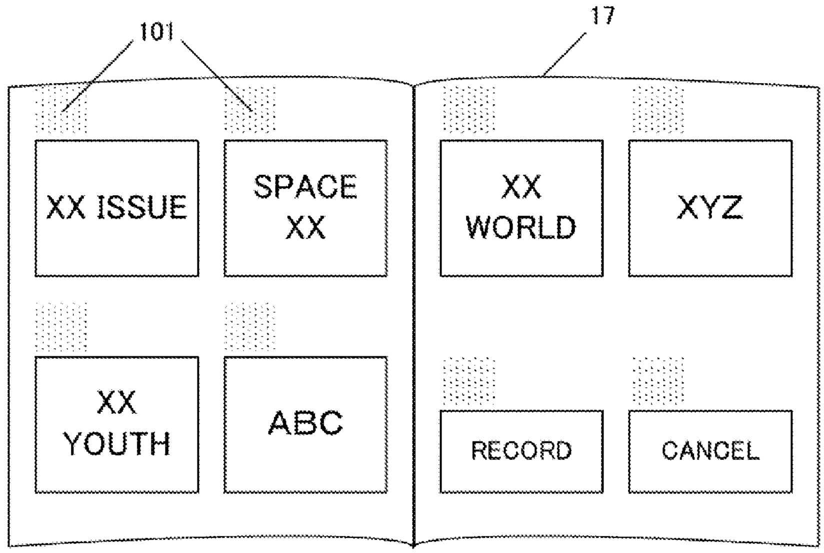
FIGS. 10A and 10B are diagrams illustrating a medium and a display, on which dot patterns are provided above the icons.
Figure 10B:
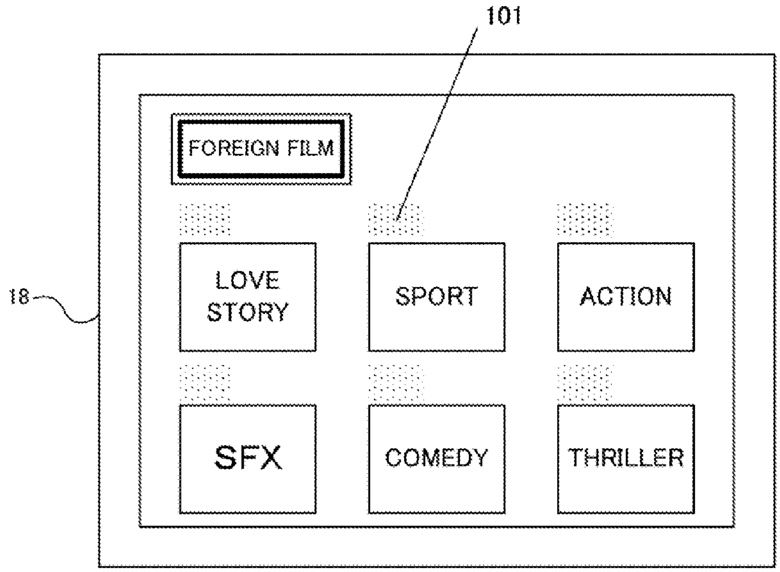

FIGS. 10A and 10B are diagrams illustrating a medium 17 and a display 18 used in the invention.

As described above, a user operates a set-top box or a television and performs operations, such as reproducing of content, by touching with the remote control device 1 on the medium 17 on which the dot pattern 101 is printed. FIG. 10A is a diagram illustrating such a medium 17. The medium 17 is printed with graphics, such as an icon, a text, a figure, an illustration, and a photograph, and dot patterns 101 on the same surfaces of the graphics. The dot pattern 101 corresponds to each graphic and if the user touches the dot pattern 101 with the remote control device 1, a processing corresponding to the content shown by the graphic is performed. For example, if the user touches a dot pattern 101 printed on the same surface with an icon indicating "Record," recording of a television program is performed.

FIG. 10B shows another embodiment of the invention. In the invention, not only a medium 17 printed with the dot pattern 101 but also a display 18 displaying the dot pattern 101 can be used.

In such a display 18, a part of the display 18 displays the dot pattern 101. Then, the display 18 displays an image, such as an icon, a text, a figure, an illustration, and a photograph, corresponding to each dot pattern 101.

If a user touches the dot pattern 101 on the display 18 with the remote control device 1, then, likely to when touching on the medium 17, a processing corresponding to the content of the image is performed in the control-subject apparatus.

Figure 11A:
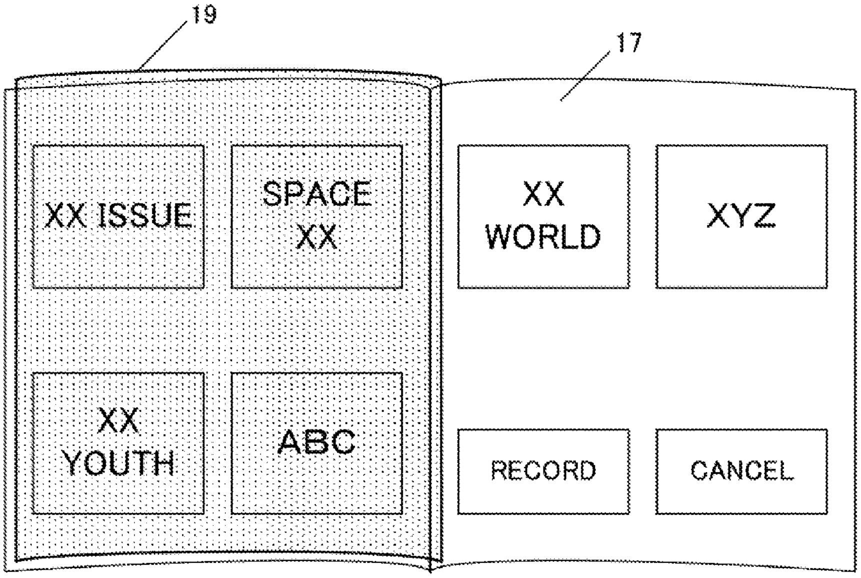
FIGS. 11A and 11B are explanatory diagrams illustrating an information input assisting sheet used with a medium and a display.
Figure 11B:
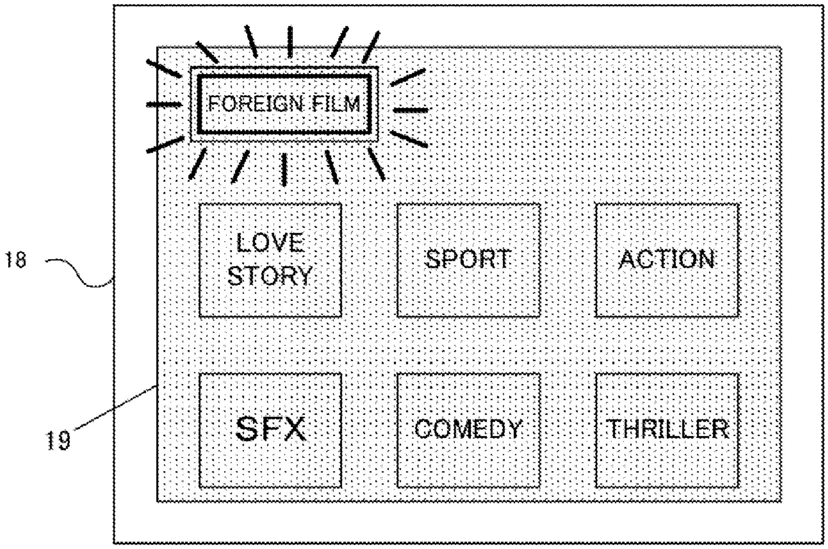

FIG. 11A is a diagram illustrating a case in which an information input assisting sheet (grid sheet 19) that is a transparent sheet and printed with a dot pattern 101 is placed on the medium 17. FIG. 11B is a diagram illustrating the case in which the grid sheet 19 is attached on the display 18.

The dot pattern 101 printed on the grid sheet 19 is made into a pattern with an XY coordinate value and/or a code value according to a predetermined algorithm. A user touches the grid sheet 19 with the remote control device 1 in accordance with an instruction on a medium seen through the sheet or on a display screen. The remote control device 1 reads out the dot pattern 101, analyzes the dot pattern 101, calculates XY coordinates on the grid sheet 19, and converts into the XY coordinate values on the display.

Such an operation realizes a touch panel style input using the grid sheet 19, allows provision of a low cost and convenient touch panel, and further allows viewing of information to which link information is not set, when browsing Internet sites, by searching relevant information. For such cases, the remote control device 1 provides an optimal embodiment.

As for the structure of the grid sheet 19, the grid sheet 19 is formed as a transparent film and printed with a dot pattern 101. The grid sheet 19 used by placing on the medium 17 as shown in FIG. 11A, is composed of a layers of a transparent infrared diffuse reflection layer, a dot pattern layer, and a transparent sheet for protection, in the order from the rear side (medium side).

The infrared diffuse reflection layer has a characteristic to diffusely reflect infrared rays and transmit visible light from one side. The infrared rays irradiated from the infrared irradiation unit is, first, absorbed into the dot part of the dot pattern layer, yet transmit through the other region. Next, the transmitted infrared rays are diffusely reflected from the infrared diffuse reflection layer, and transmit other than the dot part of the dot pattern layer.

The transparent sheet for protection is formed with material that transmits visible light and infrared rays, such as polyvinyl chloride (PVC), polyethylene terephthalate (PET), and polypropylene (PP). If the remote control device 1 repeatedly touches the dot pattern 101, the dots are worn out, raising a problem where the dot pattern 101 cannot be accurately read. Thus, the transparent sheet for protection is provided to prevent the dots from wearing and dirt, allowing a longer use period of the sheet.

Moreover, the grid sheet 19 used by being attached on the display 18, as shown in FIG. 11B, is composed of an adhesive layer, an infrared diffuse reflection layer, a dot pattern layer, and a transparent sheet for protection in the order from the rear side (from the display 18 side).

The adhesive layer is formed with a removable material. Having such an adhesive layer allows the grid sheet 19 to be easily attached on the display 18.

Descriptions are omitted for the infrared diffuse reflection layer, the dot pattern layer, and the transparent sheet for protection, as these are the same as the ones used for the grid sheet 19 used with the medium 17.

Figure 12A:
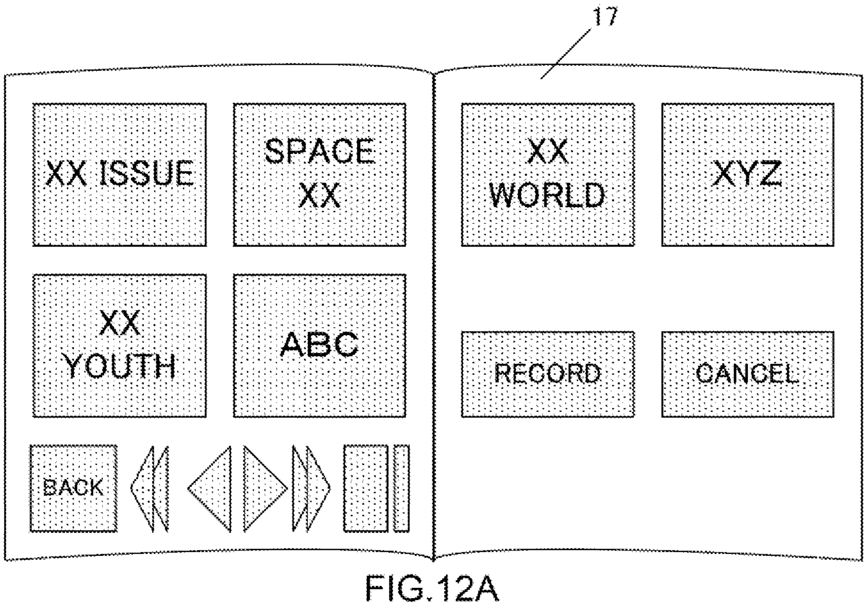
FIGS. 12A and 12B are diagrams illustrating a medium on which dot patterns and icons are superimposed and printed and a display on which dot patterns and icons are superimposed and displayed.
Figure 12B:
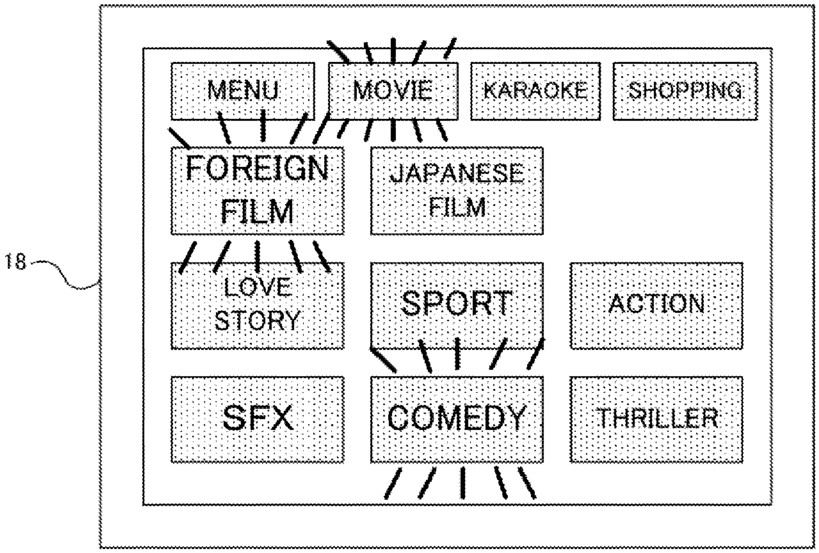

FIGS. 12A and 12B are diagrams showing other embodiments of the medium 17 with a dot pattern 101 printed thereon and the display 18 with a dot pattern 101 displayed thereon. In FIG. 12A, graphics, such as an icon, a text, a figure, an illustration, and a photograph, and a dot pattern 101 are superimposed and printed on the printed surface. In FIG. 12B, still images or motion images, such as an icon, a text, a figure, an illustration, and a photograph, and a dot pattern 101 are superimposed and displayed on the display 18.

In this way, the dot pattern 101 can be printed and displayed by being superimposed on a graphic.

Figure 13A:
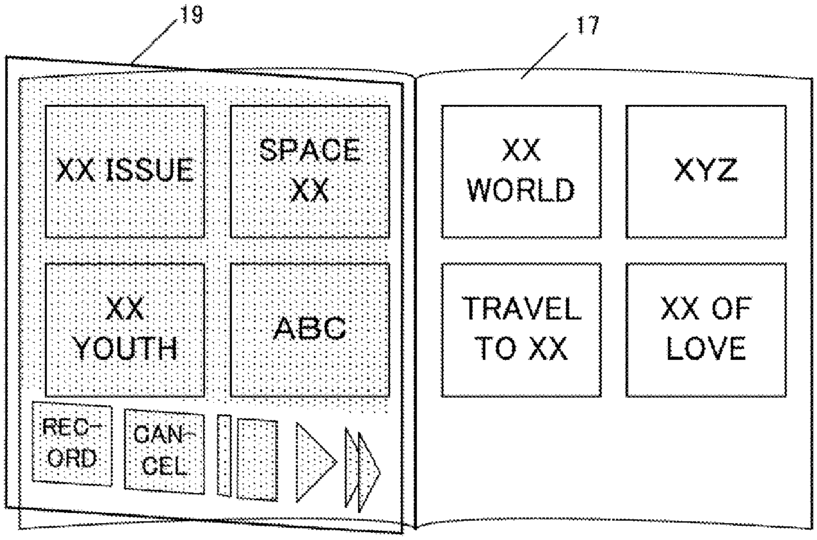
FIGS. 13A and 13B are diagrams illustrating an information input assisting sheet on which graphics are printed.
Figure 13B:
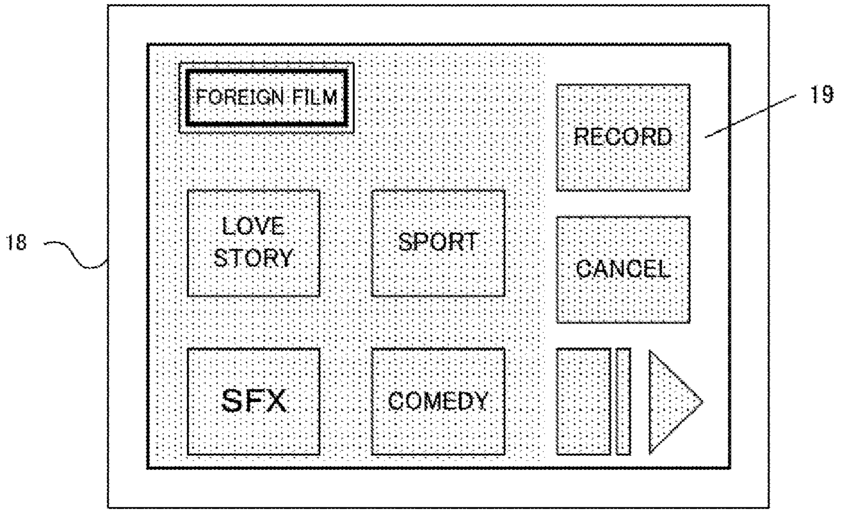

FIGS. 13A and 13B are drawings illustrating a case in which graphics are printed on the grid sheet 19. FIG. 13A is a diagram showing a state where the grid sheet 19 is disposed on the medium 17, and graphics, such as a record and a cancel, are superimposed and printed at the bottom. FIG. 13B is a diagram showing a state where the grid sheet 19 is attached on the display 18, and graphics, such as a record and a cancel, are superimposed and printed on the right side.

In this way, the grid sheet 19 can be superimposed and printed with the dot pattern 101 and a graphic.

Figure 14A:
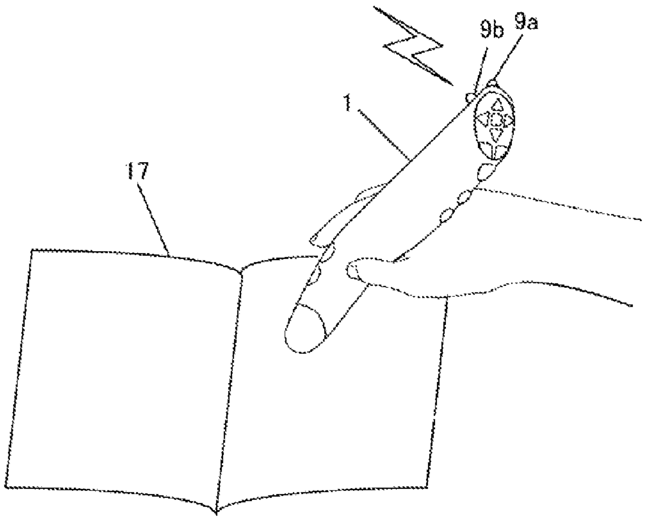
FIGS. 14A and 14B are diagrams illustrating a remote control device on which a plurality of infrared emission units are provided.
Figure 14B:
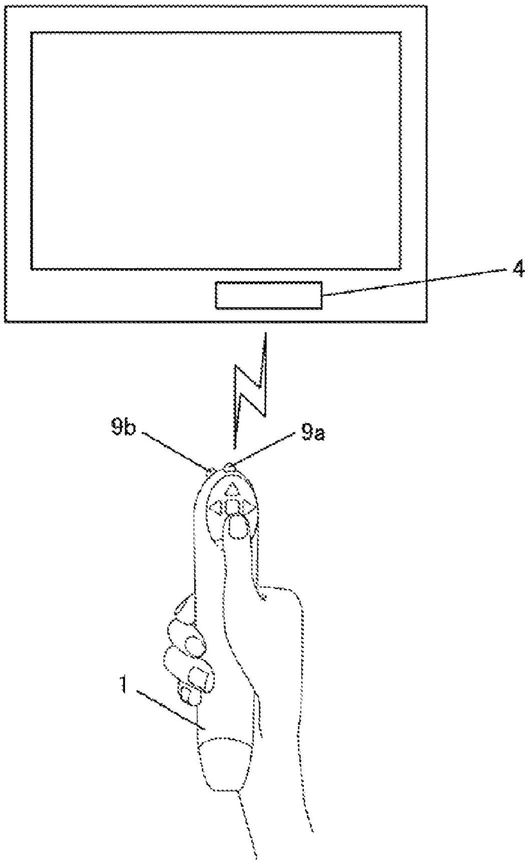

FIGS. 14A and 14B are explanatory diagrams showing the infrared emission unit 9 (a transmission unit). As shown in FIGS. 14A and 14B, there are provided a first infrared emission unit 9*a* on top of the device body 2 and a second infrared emission unit 9*b* on the left side thereof.

Having a plurality of infrared emission units in this way, the infrared rays can be surely transmitted to the infrared reception unit 4 of the control-subject apparatus, whether when a user controls the control-subject apparatus by touching the dot pattern 101 on the medium by holding the remote control device 1 just as holding a pen as shown in FIG. 14A, or when the user controls the control-subject apparatus by gripping the remote control device 1 and manipulating the arrow key 7 as shown in FIG. 14B.

As the remote control device 1 has the above-described feature, it should be appreciated that the remote control device can be used with easy operation, excellent convenience and high affinity for users, not only for control-subject apparatuses using dot patterns but also control-subject apparatuses including existing television receivers and set-top boxes which do not use a dot pattern.

Figure 15A:
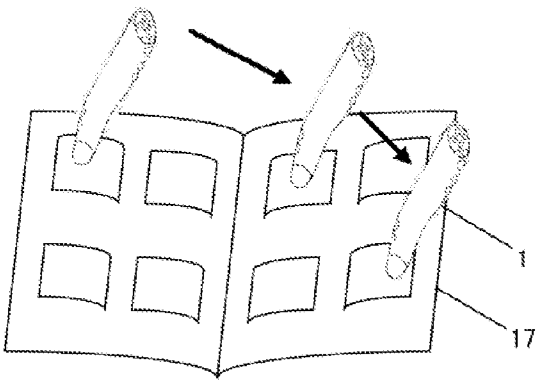
FIGS. 15A and 15B are diagrams illustrating a function for transmitting a plurality of infrared codes at once.
Figure 15B:
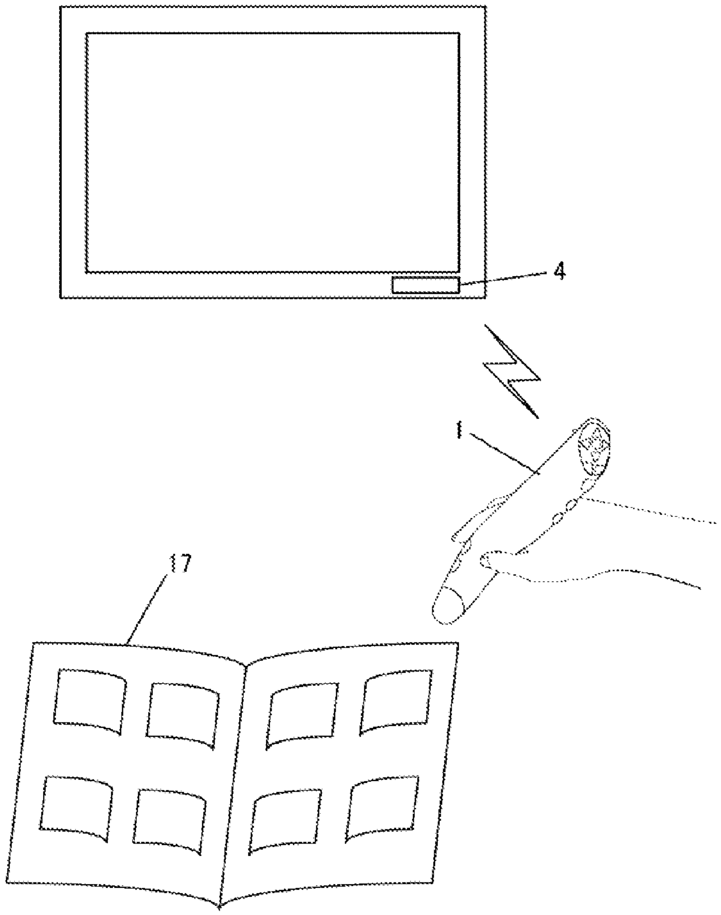

FIGS. 15A and 15B are diagrams illustrating a feature for transmitting infrared rays. When a user touches the dot pattern 101 with the optical reading unit 3 of the remote control device 1, the CPU in the remote control device 1 converts the read dot pattern 101 into the dot code, refers to an infrared code table (the details are described later) registered in the FM (flash memory), and reads out the infrared code corresponding to the dot code. If the user consecutively touches a plurality of dot patterns 101, the read dot codes are converted into infrared codes and sequentially stored in the memory. Then, when the user presses the transmission button 14, the CPU of the remote control device 1 sequentially transmits the plurality of infrared codes stored in the memory toward the infrared reception unit 4 of the control-subject apparatus.

In this way, it is possible that the remote control device 1 of the invention stores a plurality of the infrared codes in the memory in the remote control device 1, and, later, outputs and transmits the codes collectively. As a user can consecutively read dot patterns with the optical reading unit and convert into transmission codes, then transmit one or two or more signals collectively, the user does not have to confirm if the infrared code is received by the infrared reception unit 4 when touching a dot pattern 101 each time, which provides the remote control device 1 with excellent convenience and operability.

Figures 16A, 16B:
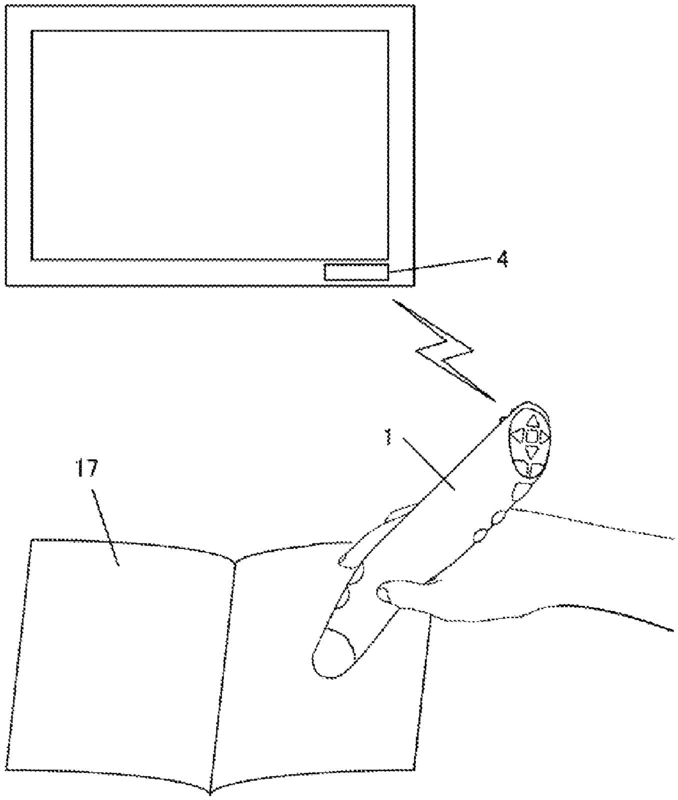
FIGS. 16A and 16B are diagrams illustrating an infrared code table and a repeat function of the transmission button.

FIGS. 16A and 16B are diagrams illustrating the infrared code table and the repeat function of the transmission button 14.

As described above, an infrared code table is registered in the FM of the remote control device 1. The infrared code table is a table indicating a correspondence between a dot code and an infrared code. The infrared code includes an operation instruction code indicating an operation of a control-subject apparatus such as a television. For example, when the read dot code is 53001, the operation is power ON/OFF.

The CPU reads out an infrared code corresponding to a dot code from the infrared code table, and transmits the read infrared code from the infrared emission unit 9 toward the infrared reception unit 4 of the control-subject apparatus. The television receiver performs an operation corresponding to the received infrared code, such as a processing of turning ON the power.

If the infrared signal transmitted from the remote control device 1 does not reach the control-subject apparatus, the control-subject apparatus cannot perform an operation corresponding to the infrared code. In such a case, if the user presses the transmission button 14, the same infrared code as the previously transmitted infrared code is transmitted. Thus, the transmission button 14 has a repeat function.

As such, the remote control device 1 is provided with a transmission button having the repeat function. For example, even if an infrared signal was transmitted and the transmitted signal could not be recognized by the control-subject apparatus due to an obstacle and the like, the transmitted code can be easily transmitted again.

Figure 17A:
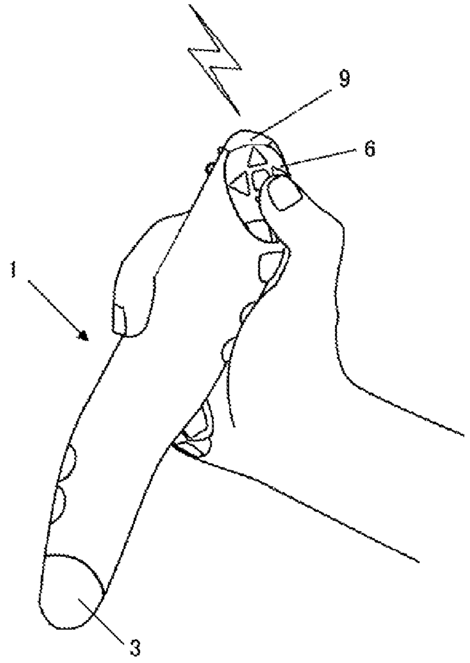
FIGS. 17A and 17B are diagrams illustrating structures of the remote control device and positions of the operation unit.
Figure 17B:
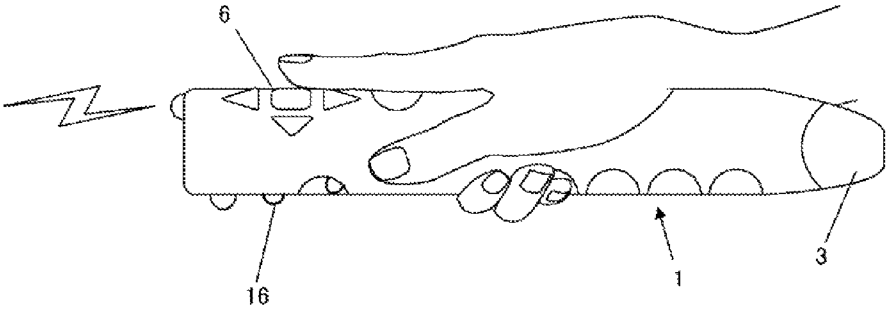

FIGS. 17A and 17B are diagrams illustrating the structure of the remote control device 1 and the arrangement of the operation unit 6. As shown in FIG. 17A, if the remote control device 1 has a structure in which a user operates by holding the remote control device just like holding a pen and directing the sensor unit 3 (optical reading unit) downward, the inclination surface 5 on which the operation unit 6 is provided is arranged so that the inclination surface faces the operator's side.

FIG. 17B is a diagram showing the remote control device 1 of a structure in which the user operates by gripping the remote control device 1 and directing the sensor unit 3 to the operator side. In this case, the operation unit 6 is disposed so that the operation unit 6 faces the control-subject apparatus side.

In this way, by differentiating the structures of the remote control devices 1, it is possible to provide an easily operable remote control device 1 with excellent convenience, accommodating a variety of user's holding styles, such as holding the remote control device 1 like a pen or gripping.

Figure 18A:
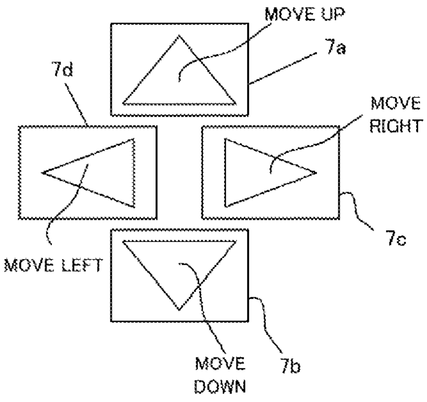
FIGS. 18A and 18B are diagrams illustrating designs of an arrow key provided on the operation unit.
Figure 18B:
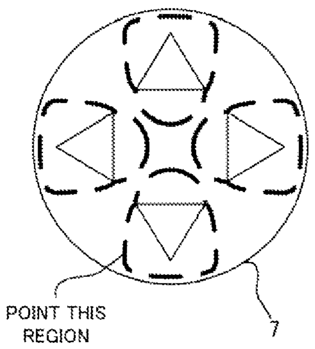

FIGS. 18A and 18B are diagrams illustrating the structure of the operation unit 6. FIG. 18A is a diagram showing a state where a plurality of arrow keys 7 operable in longitudinal and lateral directions are independently disposed. The arrow key 7*a* disposed on top of the operation unit 6 is used when a user desires to move the selection of the item of the menu display upward. Similarly, the arrow key 7*b* disposed at the bottom of the operation unit 6 is used to move the selection downward; the arrow key 7*c* disposed on the right of the operation unit 6 is used to move the selection rightward; and the arrow key 7*d* disposed on the left of the operation unit 6 is used to move the selection leftward.

FIG. 18B is a diagram illustrating another structure of the operation unit 6. In FIG. 18B, there is provided an arrow key 7 operable in longitudinal and lateral directions and integrated in a ring shape. If the operator presses a region of the disc-shaped integrated arrow key 7 where the arrow points upward or around the region, the selection of the item of the menu display moves upward. Similarly, when pressing a region of the disc-shaped integrated arrow key 7 where the arrow points downward and around the region, the selection of the item of the menu display moves downward; when pressing a region of the disc-shaped integrated arrow key 7 where the arrow points leftward or around the region, the selection of the item of the menu display moves leftward; and, when pressing a region of the disc-shaped integrated arrow key 7 where the arrow points rightward or around the region, the selection of the item of the menu display moves rightward.

Figure 19A:
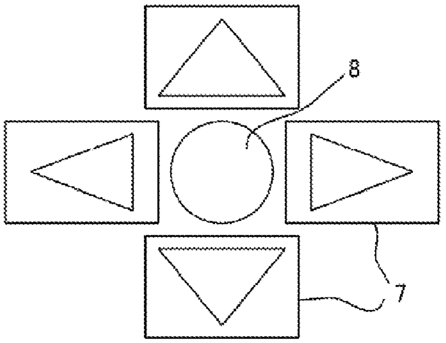
FIGS. 19A to 19D are diagrams illustrating designs of an enter key provided on the operation unit.
Figure 19B:
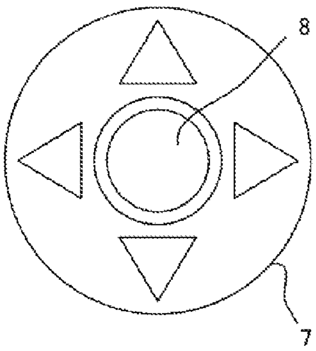
Figure 19C:
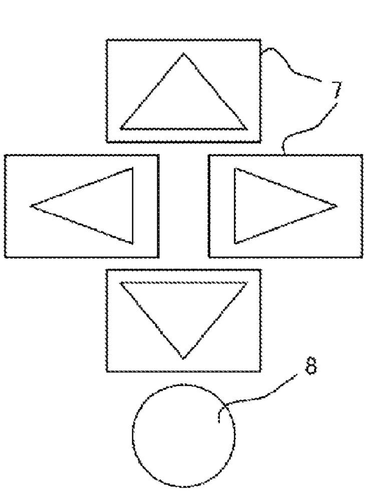
Figure 19D:
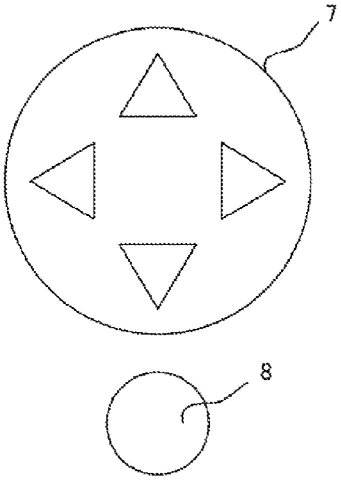

FIGS. 19A to 19D are diagrams illustrating an operation unit 6 having an enter button 8. The enter button 8 is, after a predetermined operation is selected, for determining the selected content. As shown in FIGS. 19A and 19B, the enter button 8 is provided in the middle of the arrow key 7. Alternatively, the enter button may be provided outside and near the arrow key 7, as shown in FIGS. 19C and 19D. It should be noted that the enter button is provided at the bottom of the arrow key in FIGS. 19C and 19D, the position is not limited to this, and the enter key may be provided anywhere as long as outside and near the arrow key. 7

Further, not only the enter button 8 disposed on the inclination surface 5 of the remote control device 1, there is a second enter button 8*a* disposed at the bottom of the front side of the device body 2 as shown in FIG. 1. In this way, by providing two enter buttons 8 and 8*a*, the enter button 8 or 8*a* can be easily pressed whether when gripping the device body 2 or when holding the device body 2 just like a pen, which allows to provide the remote control device 1 with excellent convenience for users. It should be noted that the enter buttons 8 and/or 8*a* may also have the same functions as the left and right buttons of a mouse.

Figure 20A:
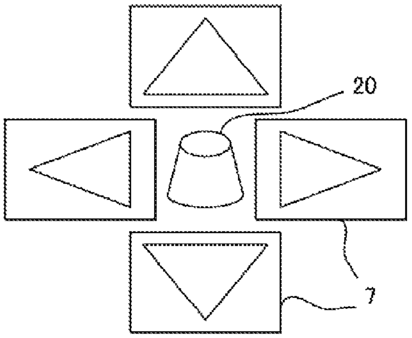
FIGS. 20A to 20D are diagrams illustrating a pointing device provided on the operation unit and designs thereof.
Figure 20B:
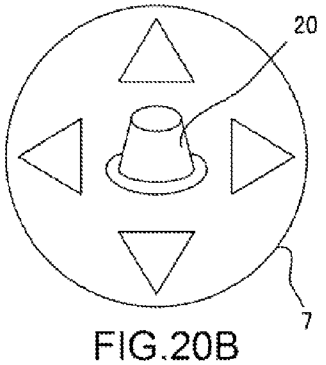
Figure 20C:
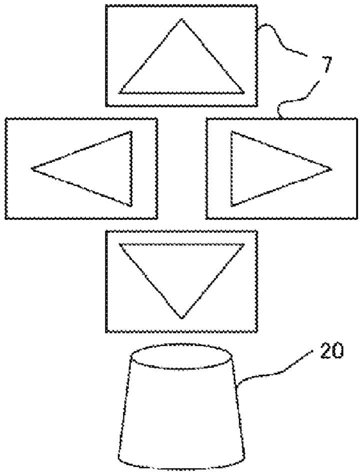
Figure 20D:
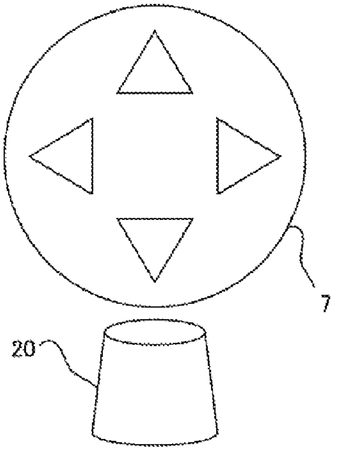
Figure 21A:
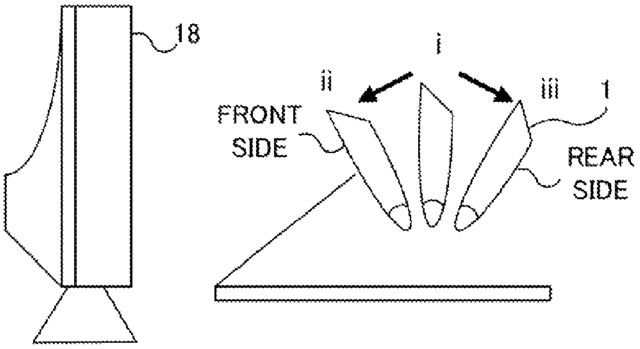
FIGS. 21A to 21D are diagrams illustrating an operation for selecting and determining an item by tilting the remote control device to an operator's side or the opposite side to the operator and an image captured by touching on the medium.
Figure 21B:
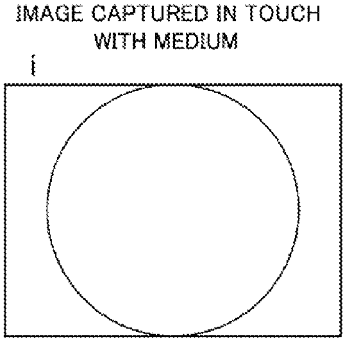
Figure 21D:
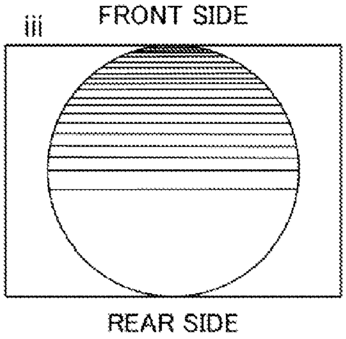
Figure 21C:
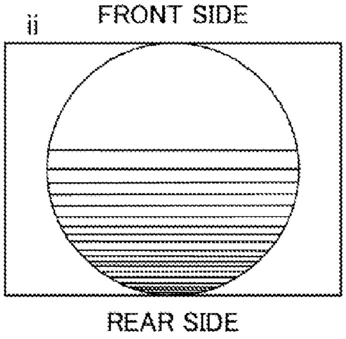
Figure 22A:
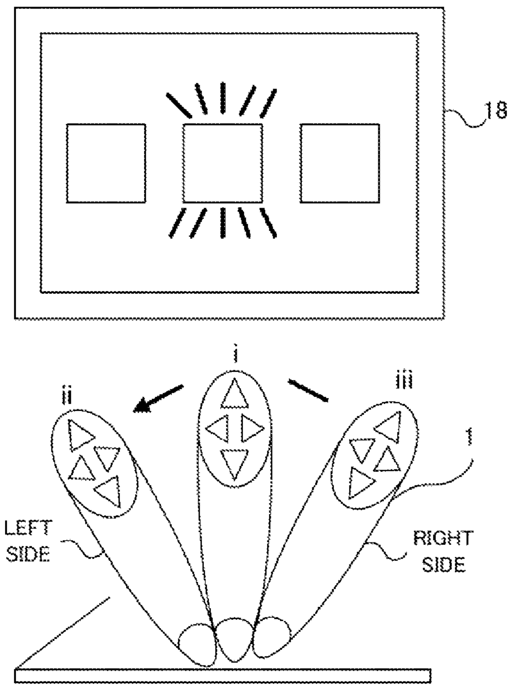
FIGS. 22A to 22D are diagrams illustrating an operation for selecting and determining an item by tilting the remote control device laterally.
Figure 22B:
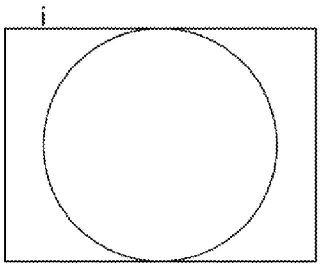
Figure 22D:
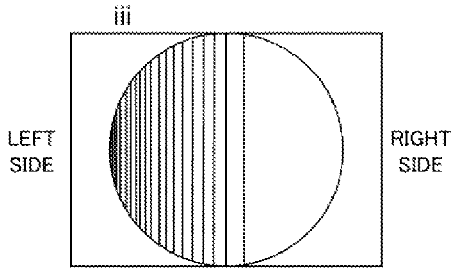
Figure 22C:
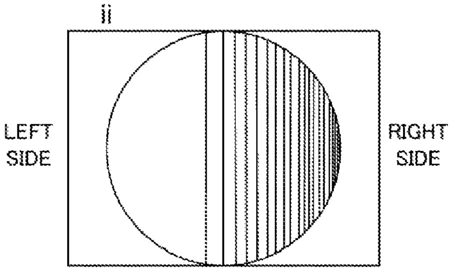

FIGS. 20A to 20D are diagrams illustrating a structure of the operation unit 6 having a pointing device 20. FIGS. 20A and 20B are cases where arrow keys 7 are provided in the center of the arrow keys 7. FIGS. 20C and 20D are cases where the pointing devices are provided outside and near the arrow keys 7. It should be noted that in FIGS. 20C and 20D, the pointing devices are provided below the arrow keys 7, the position is not limited to this, and the pointing device may be provided anywhere as long as outside and near the arrow key 7.

A user presses the pointing device 20 with a finger just as tilting the pointing device in a direction where the user desires to move the cursor displayed on the display. Moreover, the pointing device 20 can also function as an enter button 8 if the user vertically presses the pointing device 20 with a finger. It should be noted that only the pointing device 20, without the arrow key 7, may be mounted to move the cursor displayed on the display and/or select and determine items.

FIGS. 21A to 22D are diagrams illustrating a method for selecting and determining an item without using the operation unit 6 described above.

In this embodiment, a predetermined menu is displayed on the display 18, and, when a plurality of items in the menu are in selective status, items are selected and determined by recognizing the inclination of the longitudinal axes of the remote control device 1 during a predetermined time period.

That is, the remote control device 1 is handled like a joystick. Based on the initial inclination state of the remote control device shown in FIG. 21A-*i*, one tilting movement of a predetermined angle or more toward the opposite direction to the operator (FIG. 21A-*ii*) or one tilting movement of a predetermined angle or more toward the operator side (FIG. 21A-*iii*) selects an item just above or below the presently selected item. Likewise, one tilting movement of a predetermined angle or more toward the left side direction as seen from the operator (FIG. 22A-*ii*) or one tilting movement of a predetermined angle or more toward the right side direction as seen from the operator (FIG. 22A-*iii*), selects an item at left or right from the presently selected item.

Further, if the remote control device 1 is returned to the initial inclination state within a predetermined time period, the operation becomes a standby state waiting for executing a next operation, and if the predetermined time period is over, items upward, downward, leftward, or rightward are displayed and selected one after another each for a predetermined elapse time until the remote control device 1 is returned to the initial inclination state.

Further, FIGS. 21B to 21D and FIGS. 22B to 22D describe another method for performing operations in longitudinal and lateral directions by tilting of the remote control device 1.

The remote control device 1 performs calibration settings when starting recognition, based on the initial inclination state where the remote control device 1 stands generally perpendicular to the surface of the medium 17 with the sensor unit 3 touching the surface of the medium 17 and the initial light-dark state which is a light-dark state of the image read out by the sensor unit 3 in the initial inclination state. The remote control device 1 relatively recognizes the change of the angle when the remote control device 1 is tilted while keeping the sensor unit 3 touching on the medium surface based on the difference between the light-dark state of the image captured by the sensor unit 3 and the initial light-dark state. That is, as shown in FIGS. 21B to 21D and FIGS. 22B to 22D, when the remote control device 1 is tilted while keeping the sensor unit 3 touching on the medium surface, the direction toward which the remote control device was tilted becomes bright. In this way, longitudinal and lateral direction operations described above can be intuitively realized.

Moreover, by recognizing the relative inclination of the remote control device 1 based on the difference between the light-dark states, sensory tilting operation can be accurately recognized regardless of the difference of individual lots generated through production of optical reading units and the angle of remote control device body with reference to the medium surface when touching on the medium surface.

Figure 23A:
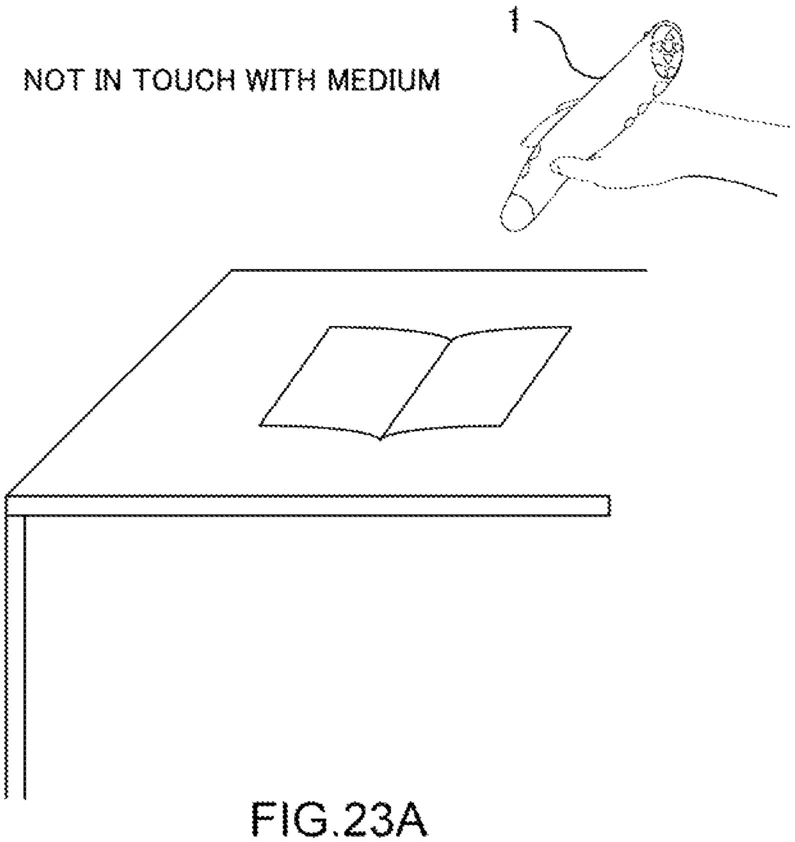
FIGS. 23A and 23B are diagrams illustrating a captured image in a case where the remote control device does not touch a medium.
Figure 23B:
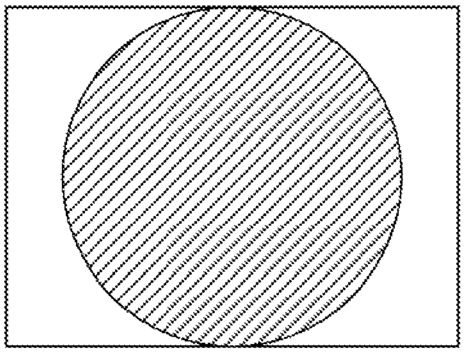

FIGS. 23A and 23B are diagrams illustrating a state where the remote control device 1 is not in touch with the medium 17. In this case, the image read out by the optical reading unit 3 becomes black as shown in FIG. 23B, and any operation by the optical reading unit 3 and reproduction of the content and the like become impossible.

Figure 24A:
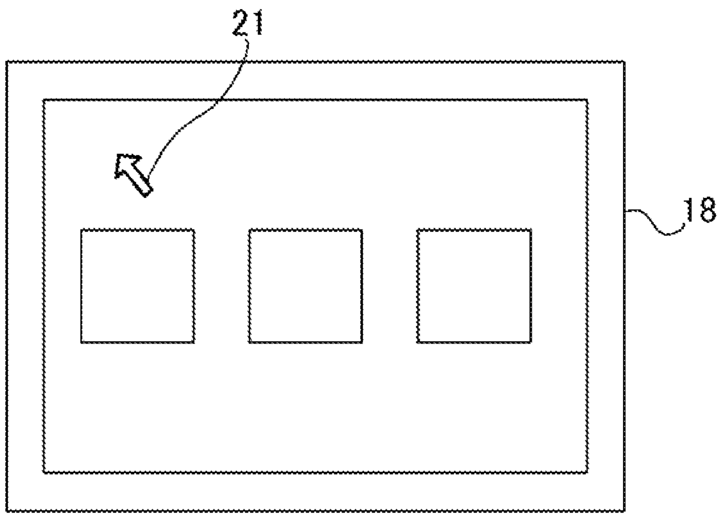
FIGS. 24A and 24B are diagrams illustrating a movement of a cursor.
Figure 24B:
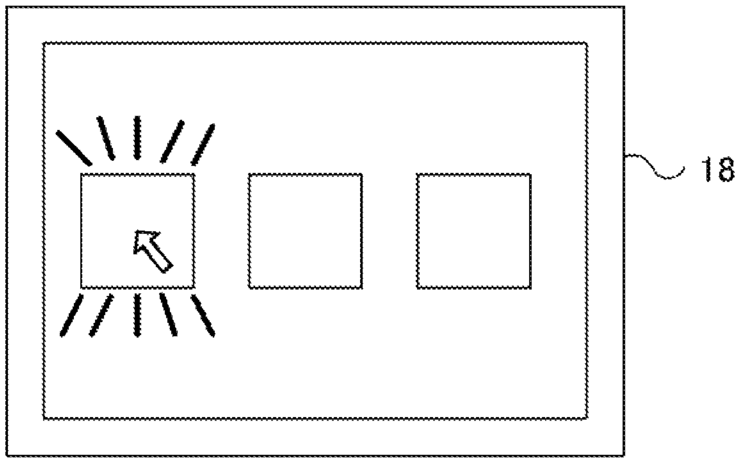

FIGS. 24A and 24B are diagrams illustrating a movement of the cursor 21 when the operation of FIGS. 21A to 22D are performed in the case where the cursor 21 is displayed on the display 18.

When the cursor 21 is displayed on the display 18, and a predetermined item is selected and waiting for a determination or no item is selected as shown in FIG. 24A, if the remote control device 1 is tilted by a predetermined angle or more in an arbitrary direction from the present inclination state of the remote control device 1 by handling the remote control device 1 like a joystick as in FIGS. 21A to 22D, the cursor 21 moves according to a predetermined algorithm corresponding to the angle changed by the tilting in the same direction. Then, as shown in FIG. 24B, an item is selected in a state where the cursor 21 is located on the item, and the movement of the cursor 21 stops if the main body is return to the initial inclination state and the item becomes a standby state waiting for the next operation.

Recently, control-subject apparatuses on which the cursor 21 is displayed, such as an Internet television, are increasingly available. According to the invention, it is possible to provide the remote control device 1 which can move the cursor 21 with an easy and more intuitive operation.

Figure 25A:
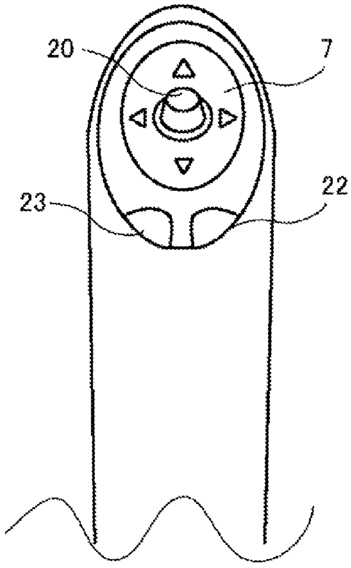
FIGS. 25A and 25B are diagrams illustrating a remote control device on which right and left buttons are provided.
Figure 25B:
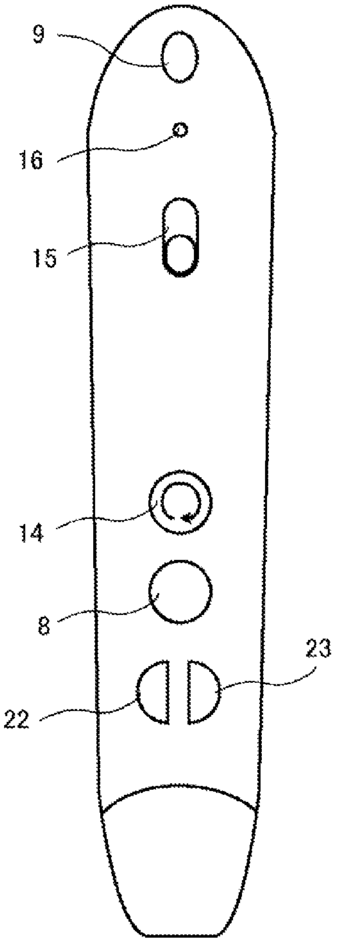

FIGS. 25A and 25B illustrate another embodiment of the remote control device 1. The device body 2 is equipped with two buttons (right button 22 and left button 23) which perform an operation corresponding to the location of the cursor 21 displayed on the display 18 and have the same functions as left and right buttons of a mouse. In FIG. 25A, the two buttons are provided at the bottom of the inclination surface 5 and, in FIG. 258, the two buttons are provided at the bottom of the front side of the device body 2. Having the two buttons at the bottom of the front side of the device body 2, a user can easily press the enter button 8 after moving the cursor while holding the device body 2 just like holding a pen. It should be noted that the buttons having similar functions to the left and right buttons of a mouse may be one or two or more.

Figure 26:
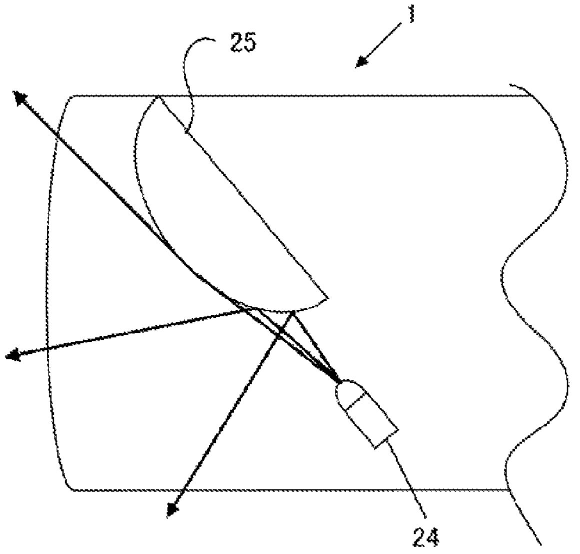
FIG. 26 is a diagram illustrating a remote control device on which a convex mirror surface unit is provided.
Figure 27:
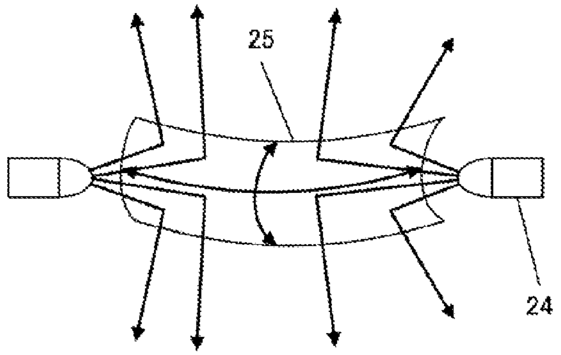
FIG. 27 is a diagram illustrating a remote control device on which a convex mirror surface unit is provided in two-dimensional directions.
Figure 28:
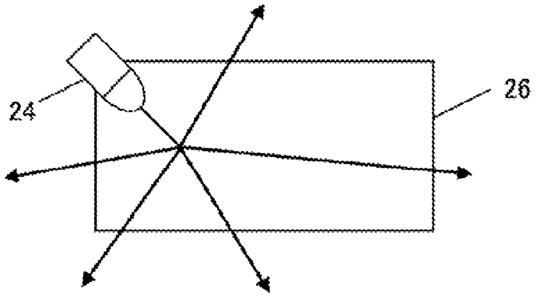
FIG. 28 is a diagram illustrating a remote control device on which a diffusion reflector is provided.

FIGS. 26 to 28 show another embodiment of the invention. The remote control device 1 shown in FIGS. 26 to 28 is composed of an operation unit 6 having a plurality of operation buttons, a device body 2 equipped with the operation unit 6, and an infrared emission unit 9 mounted on a part of the device body 2.

Then, the infrared emission unit 9 is composed of one or two or more of infrared emission elements 24 which directly irradiate light on the device body 2 side and a convex mirror surface unit 25 provided on the main body side. Infrared rays irradiated from the infrared emission element 24 are reflected in a plurality of directions from the convex mirror surface unit 25, which enlarges the irradiated area as shown in FIG. 26.

As the remote control device 1 of the invention has a structure in which the convex surface can expand the area irradiated by the infrared rays, the remote control device 1 can accurately irradiate infrared rays no matter how the remote control device is placed with reference to the control-subject apparatus in a state where the remote control device 1 stands or is tilted. Therefore, although LEDs (infrared emission elements 24) whose infrared irradiation angles are approximately 60 degrees are conventionally needed to be disposed at two locations, by having the convex mirror surface unit 25, the area irradiated by infrared rays can be further expanded and a single LED (infrared emission element 24) is enough for irradiation, which makes possible a decrease of material costs and a significant decrease of consuming electricity.

It should be noted that the convex mirror surface unit 25 may be formed as convex shape in two dimensional directions as shown in FIG. 27, as well as formed as convex shape in one dimensional direction along the body shape. In this way, regardless of the angle in which the remote control device 1 is operated, the infrared signal can accurately reach the control-subject apparatus. Further, the infrared emission element 24 may be provided on only one side of the convex mirror surface unit 25 as well as on both sides thereof.

Further, as the convex mirror surface unit 25 plays a roll to expand the irradiated region by reflecting infrared rays, a diffusion reflector having a similar function may be used instead of the convex mirror surface unit, as shown in FIG. 28.

<Second Embodiment>

A second embodiment for carrying out the invention is now described with reference to the drawings.

Figure 29:
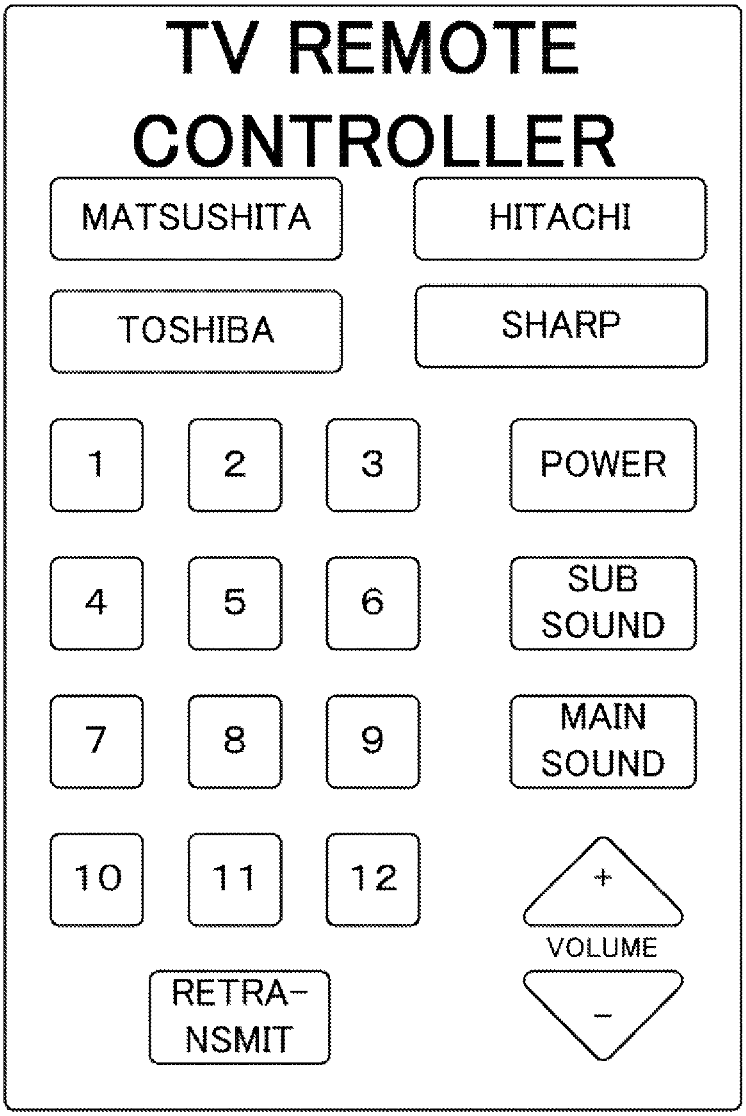
FIG. 29 is a diagram illustrating a paper remocon.

FIG. 29 is a drawing of a paper remocon (a medium) used with the remote control device 1 of the embodiment of the invention.

A case is described, where a user uses the remote control device 1 and operates a television of manufacturer A and a television of manufacturer B as control-subject apparatuses using a paper remocon for general use.

The paper remocon is printed with remote controller operation icons and television operation icons. The remote controller operation icons are superimposed and printed with a transmission code conversion table dot codes, and the television operation icons are superimposed and printed with dot codes relating to television operations and dot codes relating to a retransmission instruction of the previously selected infrared code to the remote controller.

When a user tries to operate the television of manufacturer A, the user, first, touches a manufacturer icon indicating "Manufacturer A" with the optical reading unit of the remote control device. The dot patterns superimposed and printed with the icons are analyzed, the transmission code conversion table number 01 is obtained, and according to the number, the transmission code conversion table for manufacturer A shown in FIG. 30A is retrieved from the storage unit, and a control signal for manufacturer A is allocated to each button of the operation unit of the remote controller. Such a remote control device state is referred to as the manufacturer A mode for convenience.

If the operation icon "Power" of the paper remocon in the manufacturer A mode is touched by the optical reading unit of the remote control device, the operation icon dot code 1001 is analyzed from the dot pattern superimposed and printed thereon, a transmission code conversion table 01 for manufacturer A is referred to, and the infrared code corresponding to the operation icon dot code is emitted. Since the transmission code conversion table for manufacturer A will not be changed until another transmission code conversion table number is read, the television of manufacturer A can be operated thereafter just by a touch on the operation icon.

When a user tries to operate the television of manufacturer B, the user touches a manufacturer icon indicating "Manufacturer B" with the optical reading unit of the remote control device. The dot pattern superimposed and printed with the icon is analyzed, the transmission code conversion table number 02 is taken, a transmission code conversion table for manufacturer B shown in FIG. 30B is retrieved from the storage unit, and a control signal for manufacturer B is allocated to each button of the operation unit of the remote controller. Such a state is referred to as the manufacturer B mode for convenience. The operation thereafter is omitted since the operation is the same as in the manufacturer A mode.

By touching "Retransmit" icon, since the dot code embedded therein is associated with the retransmission instruction of the previously selected infrared code to the remote controller, the remote controller emits the previously selected infrared code regardless of the mode. The previously selected infrared code is stored in the storage unit provided in the remote control device according to a predetermined method.

Moreover, since control signals for each manufacturer are allocated to the operation buttons equipped on the remote control device in each mode, a user can also operate the television using the operation buttons.

As described above, the most important point of the invention is that, when the remote control device touches a paper remocon and the control-subject apparatus is determined, the remote control device is accordingly transformed into a remote control device where a part or whole of the operation unit equipped thereon controls the control-subject apparatus.

To realize this, an operation button (operation unit)-operation instruction (infrared code, control of a remote contoller, or the like) table for each control-subject apparatus shown in FIG. 31 is stored in the embedded memory of the remote control device.

The table number indicating the above-described table is associated with a control-subject apparatus selected by a touch on the paper remocon and the input and output setting of the control-subject apparatus. After the selection, a variety of operation button (operation unit)-operation instruction tables of the corresponding table number are retrieved from the embedded memory, and by referring to the tables, the remote control device executes the instruction of the button operated thereafter to the control-subject apparatus. Here, it may be possible to use a predetermined selecting unit to select a new control-subject apparatus or the input and output setting of the control-subject apparatus from the menu shown in the display with the remote control device, instead of touching the paper remocon. Also, a predetermined button of the remote control device, a pointing device, an arrow key, and the like may be allocated to a predetermined operation. Further, the remote control device may stand on a medium surface and a predetermined tilting operation may be allocated to select a control-subject apparatus or an input and output setting of the control-subject apparatus. It should be noted that, as for operation button (operation unit)-operation instruction tables, a new table can be additionally changed in the storage unit embedded in the remote control device through a connection to an external memory, a PC, a mobile phone, the Internet, or a cable television. It will be appreciated that the above-described executions are also possible in a state where an external memory, instead of an internal memory or as an additional memory, is inserted into the remote control device.

Figure 32:
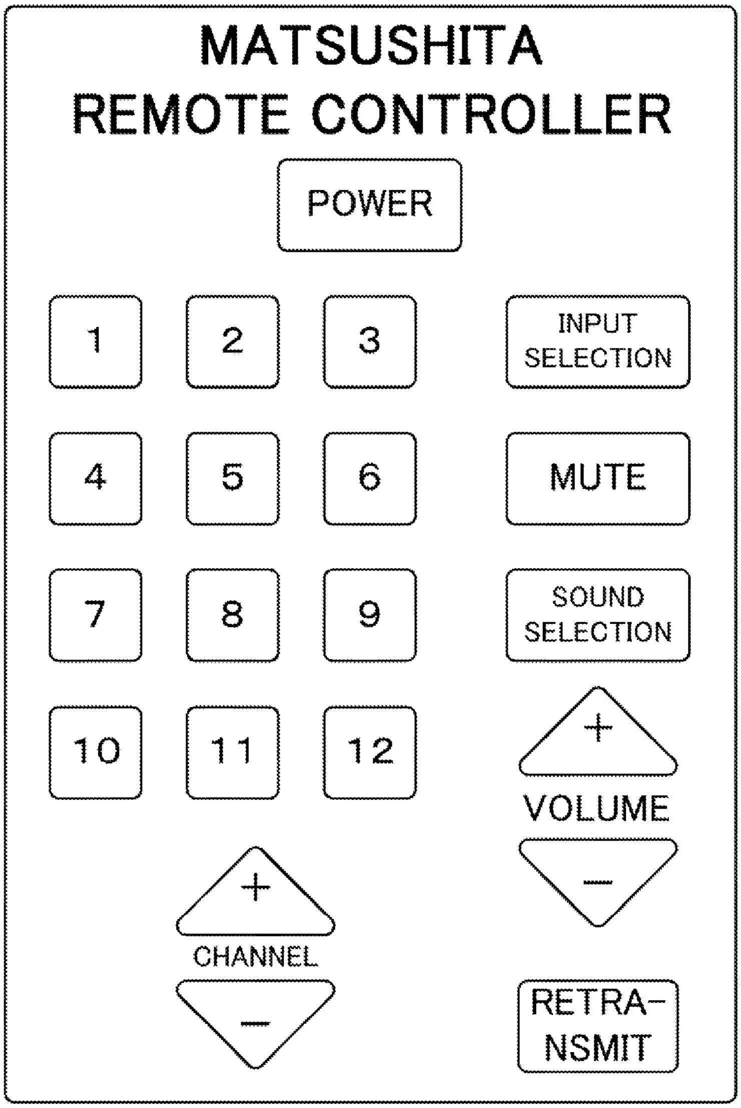
FIG. 32 is a diagram illustrating a second paper remocon.

FIG. 32 is a diagram of another paper remocon (a medium) used with the remote control device 1 of the embodiment of the invention.

An example where a user tries to use a remote control device to operate only the television of manufacturer A as a control-subject apparatus using a paper remocon dedicated for manufacturer A is described.

The remote control device in the example registers a transmission code conversion table shown in FIG. 33. The operation icon dot codes embedded in the operation icons are associated with an infrared code composed of a manufacturer code, a device code, and an instruction code or a plurality of successive infrared codes.

If a manufacturer prepares such paper remocons, a user can perform a variety of operations only with a touch on each icon using the remote control device.

Further, another example is described.

For example, when a set-top box for cable television is connected to a television monitor and the power of the television monitor is turned on, if "Power icon" is touched using a remote control device, an infrared code of "Power ON" is transmitted to the set-top box and the power of the set-top box is turned on. Next, if "132CH" on the paper remocon for BS broadcasts is touched, an infrared code of "CATV broadcast" is transmitted and, after a predetermined interval, infrared codes 'CH1,''CH3, ''CH2' are transmitted sequentially with a predetermined interval, then CATV132CH is received and displayed on the television monitor. Here, although not shown in the drawings, when "TV power icon" is provided and the television monitor is not powered on, if the icon is touched, an infrared code of "TV power ON" is transmitted to turn on the television monitor, and the input selection of the television monitor connected to the set-top box is performed to allow displaying of an input signal transmitted from the set-top box on the television monitor after a predetermined interval. Here, if the power of the television monitor is turned on, the input is switched to the television, and then, if the infrared code for input selection is transmitted, the input selection becomes input 1. If the set-top box is connected to the input 3, after turned on the television and connected to the television and after a predetermined interval, infrared codes of input selection are transmitted three times. However, if a television monitor of recent days recognizes whether the set-top box is connected, only an input selection signal for the connected set-top box is transmitted.

If the power of the television monitor is turned on, and the input selection is set to a media whose input signal is different from the one for the set-top box or the television signal cable is directly connected to the television monitor, a user is required to change the input selection to the set-top box by touching "TV power ON" to turn off the power of the television monitor once and touching the icon once again to turn on the power of the television monitor. Here, although not shown separately in the drawings, if "STB connection icon" is provided and the television monitor displays other medium (if the television monitor has not received a signal from the set-top box), the input can be switched to the set-top box just by touching the icon. Further, if a plurality of media, for example, a set-top box, a blu-ray recorder, and BS broadcast, are connected to the television monitor, "STB icon," "Blu-ray icon," "BS icon" are respectively provided on a paper remocon, and the power of the monitor television is turned on, when any one of the icons is touched, the input selection is switched so that the signal for the device in question is input into the television monitor. Specifically, if a set-top box is connected to the monitor television using "Input 1," a blu-ray is connected to "Input 2," BS is connected to "Input 4," and "STB icon" is touched, regardless of the kind of the medium for which the television monitor inputs a signal, first, an infrared code of "TVCH1" (this may be any channel) is transmitted and the television monitor displays a television of itself. Then, after a predetermined interval, an infrared code of "Input selection" is transmitted twice with a predetermined interval, and the signal for blu-ray can be displayed on the television monitor. Next, if "BS broadcast icon" is touched, after an infrared code of "CH1" is transmitted, since nothing is connected to "Input 3" and to make connection with "Input 4," an infrared code of "Input selection" is transmitted tree more times with predetermined intervals and a signal for BS can be displayed on the television monitor.

Figure 34:
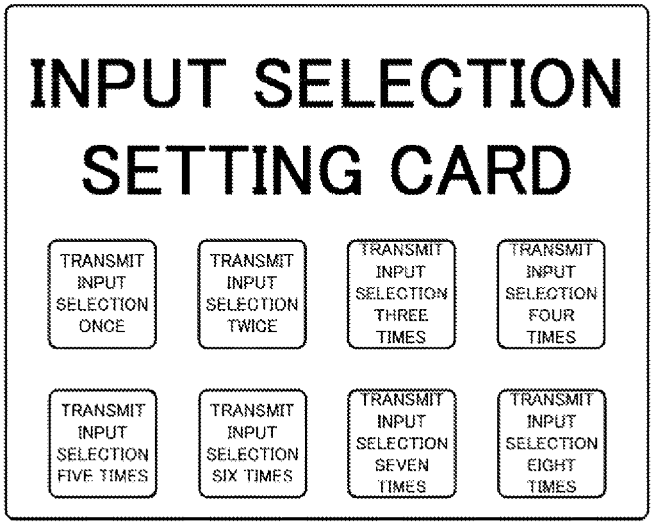
FIG. 34 is a diagram illustrating an input selection setting card and an icon-infrared code table.

As described above, if the number of the input of the television monitor to which the device is connected is confirmed, it is possible to configure the signal for the device connected with the television monitor to be input into the television monitor through one-touch operation by associating a predetermined icon to the number of transmissions of an infrared code of "CH1" and an infrared code of "Input selection" and a predetermined interval between the transmissions, as shown in FIG. 34.

Further, all the above-described intervals are mostly varied on a device by device basis, and the setting is done by consecutively transmitting a plurality of signals, starting from the shortest interval, to check if the signals function normally, and if not, gradually lengthening the interval to set an appropriate interval for each device and to specify the device, as shown in FIG. 29.

It is possible to consecutively transmitting a plurality of infrared codes and easily selecting a program with a single touch, by associating the transmissions with the variety of icons of a paper remocon.

Although all the above-described possesses can be performed by the remote control device and the paper remocon, it is possible to allocate an operation button of the remote control device to specific information, including a control-subject device, such as a set-top box and a blu-ray, connected with a television monitor and an input and output setting, such as the number of transmissions of infrared codes and the number of seconds of an interval when transmitting consecutively. In this way, when using the remote control device, the initial setting of a medium to view may be easily done each time even without a paper remocon by firstly performing operation on the allocated button.

In these examples, connections for displaying on a television monitor and controls of the connected devices were mainly described. However, with a control-subject apparatus that is indeed a computer, such as an Internet television, and input and output devices that interactively deal with enormous quantity of data, such as a printer, a web camera, and a mobile phone, it is possible to easily connect and transmit and receive signals with a variety of devices by configuring allocation information of interfaces (USB, DVi, D-SUB, etc.) to the devices and selection information of signal transmission methods (e.g., a protocol), associating the information to a predetermined icon, and touching the icon with a remote control device.

Of course, a control-subject apparatus, a variety of interfaces of input and output devices connected to the control-subject apparatus, and a method for transmitting and receiving of signals thereto and therefrom, are associated to dot codes and the dot codes are printed on the configuration manual, and the above-described settings can be performed according to the description thereof. Further, the dot pattern for a variety of settings can be operated with an intuitive touch of the icon by superimposing and printing the dot patterns with icon images signifying a control of a control-subject apparatus and a selection of a variety of interfaces and input and output signals. Moreover, the paper remocon for daily use can be used as a remote controller specially customized for a user by freely laying out dot codes and icons associated with the user's favorite devices and programs and superimposing and printing the dot codes and icons.

INDUSTRIAL APPLICABILITY

According to the invention, a remote control device with excellent convenience, operability, and affinity for users can be provided in present time when digital broadcasts, cable televisions, and Internet televisions that require complicated operations are widely available. Such a remote control device can be widely used in controls of a variety of home electric appliances and electrical devices, and used as a new form of information inputting and outputting.

1 REMOTE CONTROL DEVICE
2 DEVICE BODY
3 SENSOR UNIT
4 INFRARED RECEPTION UNIT
5 INCLINATION SURFACE
6 OPERATION UNIT
7 ARROW KEY
8 ENTER BUTTON
**8*a*** SECOND ENTER BUTTON
9 INFARED EMISSION UNIT
**9*a*** FIRST INFRARED EMISSION UNIT
**9*b*** SECOND INFRARED EMISSION UNIT
10 MENU BUTTON
11 BACK BUTTON
12 POWER SWITCH
13 VOLUME BUTTON
14 TRANSMISSION BUTTON
15 POWER BUTTON
16 STATUS INDICATION LED
17 MEDIUM
18 DISPLAY
19 GRID SHEET
20 POINTING DEVICE
21 CURSOR
22 RIGHT BUTTON OF MOUSE
23 LEFT BUTTON OF MOUSE
24 INFRARED EMISSION ELEMENT
25 CONVEX MIRROR SURFACE UNIT
26 DIFFUSION REFLECTOR
101 DOT PATTERN
102 KEY DOT
103 REFERENCE GRID POINT DOT
104 INFORMATION DOT
105 VIRTUAL GRID POINT
**106*a*-106*e*** REFERENCE POINT DOT
**106*f*-106*i*** VIRTUAL REFERENCE POINT
CPU Central Processing Unit
MM Main Memory
FM Flash Memory

What is claimed is:

1. A remote control device comprising:

an optical reading unit for reading an optically readable dot pattern that is formed on a predetermined medium surface, made into a pattern with a dot code of a code value and/or a coordinate value based on a predetermined algorithm;

a main body equipped with the optical reading unit;

a converter, equipped inside the main body, for analyzing the dot code from the dot pattern read out by the optical reading unit and, based on a transmission code conversion table which is stored in advance, converting into one or two or more transmission codes corresponding to the dot code;

an operation unit equipped on a predetermined position of the main body and comprising a plurality of operation buttons for controlling a control-subject apparatus; and a transmission unit, equipped on a predetermined position of the main body, for transmitting to the control-subject apparatus the transmission code converted by the converter and a control signal for controlling the control-subject apparatus generated via operation of the operation unit, wherein, at the predetermined medium surface, a plurality of operation icons for controlling the control-subject apparatus are superimposed on and printed with the dot pattern, and each dot pattern printed with each operation icon is made to contain beforehand, as the dot code, a manufacturer code and an instruction code, and for each of said plurality of operation icons, the manufacturer code and the instruction code are read via the optical reading unit, and in cooperation, a plurality of instructions as control signals are consecutively transmitted, in one single operation, from the transmission unit to the control-subject apparatus via operation of the operation unit.

2. The remote control device according to claim 1, wherein, by the reading of the dot code, specific information which is information specifying the control-subject apparatus and/or information specifying input and output settings of the control-subject apparatus, becomes associated with a first operation button of the operation unit, and if manipulation is performed to the first operation button before manipulation to a second operation button, when the second operation button is manipulated, one control signal based on the specific information is transmitted or a plurality of control signals based on the specific information are consecutively transmitted from the transmission unit to the control-subject apparatus.

3. The remote control device according to claim 1, wherein the specifying of input and output setting of the control-subject apparatus is carried out, based on allocation information of an interface of the control-subject apparatus to an input and output device which works with the control-subject apparatus and/or selection information of input and output signals of the control-subject apparatus and the input and output device.

4. The remote control device according to claim 1, wherein, if a plurality of the control signals are consecutively transmitted from the transmission unit to the control- subject apparatus, a transmission interval is set by reading the dot code associated with a variety of transmission intervals by the optical reading unit.

5. The remote control device according to claim 1, wherein the specifying of the control-subject apparatus is carried out by reading, by the optical reading unit, the dot code associated with a product code printed as a dot pattern on a medium surface.

6. The remote control device according to claim 1, wherein the specifying of input and output setting of the control-subject apparatus is carried out by reading, by the optical reading unit, a dot code associated with an interface allocation code of an input and output device which works with the control-subject apparatus for the control-subject apparatus and/or an input and output signal code of an input and output device, printed as a dot pattern on a medium surface.

7. The remote control device according to claim 1, wherein the product code and/or the interface allocation code of an input and output device which works with the control-subject apparatus for the control-subject apparatus and/or an input and output signal code of the input and output device, as well as control of the control-subject apparatus, are associated with the dot code and printed as a dot pattern on the medium surface.

8. The remote control device according to claim 1, wherein a dot pattern printed on the medium surface is superimposed and printed with an icon image signifying a selection of the control-subject apparatus and/or a selection of an interface allocation of the input and output device for the control-subject apparatus and/or a selection of an input and output signal of the input and output device.

9. The medium according to claim 8, wherein a dot code is customized for each household and provided on the medium surface, based on information on control-subject apparatus installed at each household and information on which channels of the control-subject apparatuses are used to connect one another and input and output information.

10. The remote control device according to claim 1, wherein the optical reading unit can optically read the dot pattern printed on the medium or displayed on a display and made into a pattern based on the predetermined algorithm.

11. The remote control device according to claim 1, wherein the optical reading unit can optically read the dot pattern printed on a transparent sheet as an information input assisting sheet placed on the medium or attached on a display and made into a pattern based on the predetermined algorithm.

12. The remote control device according to claim 11, wherein the optical reading unit can optically read the dot pattern superimposed and printed with a still image or superimposed and displayed with a motion image, such as a text, a figure, an illustration, and a photograph, on the medium, the information input assisting sheet, or the display.

13. The remote control device according to claim 1, wherein the transmission unit has a function for transmitting an infrared signal to the control-subject apparatus and one or two or more of the transmission units are provided near the operation unit.

14. The remote control device according to claim 1, wherein a transmission button which has an operation function for outputting a signal from the transmission unit to the control-subject apparatus is provided at a predetermined location on the main body.

15. The remote control device according to claim 14, wherein the transmission button provided on the main body has a repeat function for retransmitting one or two or more signals when the signal transmitted from the transmission unit was not recognized by the control-subject apparatus and/or a batch transmission function for transmitting a plurality of operations to be carried out by reading the dot pattern with the optical reading unit.

16. The remote control device according to claim 1 having a function capable of manipulating in longitudinal and lateral directions, wherein a display of the remote control device displays a predetermined menu, a plurality of items in the menu are in selectable states, and an item can be selected and determined by recognizing an inclination of a longitudinal axes of the main body within a predetermined time period, wherein, by handling the main body as a joystick, a tilting movement by a predetermined angle or more toward an opposite direction of the operator or a tilting movement by a predetermined angle or more toward a direction of the operator from an initial inclination state of the main body selects an item above or below the presently selected item, and a tilting movement by a predetermined angle or more toward left direction seen from the operator or a tilting movement by a predetermined angle or more toward right direction seen from the operator selects an item at left or right of the item presently selected, returning the main body to the initial inclination state within a predetermined time period causes the main body to be a standby state waiting for performing a next operation, and, if the predetermined time period is over, items above, below, left, or right are displayed and selected one after another each for a predetermined elapsed time until returning the main body to the initial inclination state.

17. The remote control device according to claim 1 having a function capable of manipulating in longitudinal and lateral directions, wherein the display displays a cursor, a predetermined item is selected and waiting for determination or no item is selected, the main body is handled as a joystick by recognizing a temporal change in an inclination of a longitudinal axes of the main body by a predetermined method, if the main body is tilted by a predetermined angle or more in an arbitrary direction from the inclination state of the main body, the cursor moves according to a predetermined algorithm corresponding to an angle changed by tilting the main body in the same direction, an item becomes selected in a state where the cursor is positioned over the item, and, if the main body is returned, to the initial inclination state, the cursor stops moving and turns to a standby state for performing a next operation.

18. The remote control device according to claim 1 having a function capable of manipulating in longitudinal and lateral directions, wherein, the main body has an initial inclination state where the main body stands generally perpendicular to a medium surface with the optical reading unit touching the medium surface at the time of starting recognition, calibration setting is carried out with a light and dark state of an image read out by the optical reading unit in the initial inclination state as an initial light and dark state, and change of angle when tilting the main body while keeping the optical reading unit touching on the medium surface is recognized relatively by a difference between the light and dark state of the image captured by the optical reading unit and the initial light and dark state.

19. The remote control device according to claim 1, wherein the operation button is at least used for selecting an item from a plurality of selectable menus displayed on a display, on the main body, an operation unit with the operation button provided thereon is provided at the other end on an opposite side to the optical reading unit, the main body is connected to the optical reading unit, and can be gripped or held like a pen depending on a user and/or a use purpose, and the main body is held just as holding a pen when the optical reading unit reads the dot pattern, and either held just as holding a pen or by gripping when transmitting the control signal to the control-subject apparatus.

20. The remote control device according to claim 19, wherein the operation unit is provided on an inclination surface of the other end, inclined with reference to a longitudinal axes of the main body, and, the inclination surface is disposed to face an operator when operating by holding the main body just as holding a pen with the optical reading unit directed downward, or the inclination surface is disposed to face the control-subject apparatus when operating by gripping the main body with the transmission unit oriented in a direction of the control-subject apparatus.

21. The remote control device according to claim 19, wherein the operation unit for selecting an item from a plurality of selectable menus displayed on the display has a plurality of operation buttons capable of operating at least in longitudinal and lateral directions, each independently disposed thereon, or an operation button solely capable of operating at least in longitudinal and lateral directions disposed thereon.

22. The remote control device according to claim 19, wherein the operation unit for selecting an item from a plurality of selectable menus displayed on the display has an enter button for determining selected content after a predetermined operation is selected, and the enter button is disposed at a center of or near the operation button for manipulating in longitudinal and lateral directions, or the operation unit has one unit of button main body that has a function for performing a variety of operations and/or a function for selecting and determining by pressing any part of the button main body.

23. The remote control device according to claim 22, wherein the enter button is disposed at the center of or near the operation button or integrated with the operation button, as well as at an arbitrary position in which a dot pattern can be read out by the optical reading unit by gripping the main body or holding the main body just as holding a pen and the enter button can be easily pressed.

24. The remote control device according to claim 19, wherein the operation unit for selecting an item from a plurality of selectable menus displayed on the display has a pointing device used as a coordinate instruction input assisting device, such as a pointing stick, capable of moving the cursor an arbitrary distance in an arbitrary direction and arbitrarily selecting and determining a selection.

25. The remote control device according to claim 19, wherein, on the main body, at least one button for arbitrarily performing an operation corresponding to a position of a cursor displayed on a display and having identical functions as left and right buttons of a mouse, is disposed near the operation unit in order to select an item from a plurality of selectable menus displayed on the display and/or disposed at an arbitrary position in which the enter button can be easily pressed by holding the main body just as holding a pen.

26. The remote control device according to claim 19, wherein the main body has a menu button having a function of listing contents and operation items provided by the control-subject apparatus, and has a back button, near the menu button, for going back to a previous menu display when menu items are consecutively selected.

27. The remote control device according to claim 19, wherein the main body has a volume button for tuning sound volume of the control-subject apparatus and a power button for performing on and off operations for a power of the control-subject apparatus.

28. The remote control device according to claim 19 for irradiating an infrared signal in order to perform a variety of operations to a control-subject apparatus, the remote control device comprising:

an operation unit for selecting an item from a plurality of selectable menus displayed on a display having a plurality of operation buttons;

a main body provided with the operation unit for selecting an item from the plurality of selectable menus displayed on the display; and an infrared emission unit provided on a part of the main body, the infrared emission unit comprising:

one or two or more of infrared emission elements for irradiating light directly the main body side; and a convex mirror surface unit or a diffusion reflector provided on the main body side, wherein the direct light irradiated from the infrared emission elements is reflected into multiple directions from the convex minor surface unit or the diffusion reflector to enlarge the irradiated area.

* * * * *